United States Patent
Lawlor et al.

(10) Patent No.: US 6,694,743 B2
(45) Date of Patent: Feb. 24, 2004

(54) ROTARY RAMJET ENGINE WITH FLAMEHOLDER EXTENDING TO RUNNING CLEARANCE AT ENGINE CASING INTERIOR WALL

(75) Inventors: Shawn P. Lawlor, Redmond, WA (US); Robert C. Steele, Woodinville, WA (US); Donald Kendrick, Sammamish, WA (US)

(73) Assignee: Ramgen Power Systems, Inc., Bellevue, WA (US)

( * ) Notice: Subject to any disclaimer, the term of this patent is extended or adjusted under 35 U.S.C. 154(b) by 38 days.

(21) Appl. No.: 10/200,780

(22) Filed: Jul. 23, 2002

(65) Prior Publication Data

US 2004/0016235 A1 Jan. 29, 2004

Related U.S. Application Data

(60) Provisional application No. 60/386,195, filed on Jul. 23, 2001.

(51) Int. Cl.[7] ................................................. F02K 7/10
(52) U.S. Cl. ........................ 60/772; 60/39.34; 60/39.35; 60/768
(58) Field of Search ............................. 60/39.35, 39.34, 60/772, 767, 768

(56) References Cited

U.S. PATENT DOCUMENTS

| | | |
|---|---|---|
| 2,680,950 A | 6/1954 | Burch |
| 2,688,371 A | 9/1954 | Del Pesaro |
| 2,690,809 A | 10/1954 | Kerry |
| 2,709,889 A | 6/1955 | Mount |
| 2,709,895 A | 6/1955 | Mount |
| 2,748,563 A | 6/1956 | Wiktor |
| 2,784,551 A | 3/1957 | Karlby et al. |
| 2,867,979 A | 1/1959 | Mullen II |
| 3,007,310 A | 11/1961 | Eisele |
| 3,038,301 A | 6/1962 | Carlson |
| 3,118,277 A | 1/1964 | Wormser |
| 3,325,993 A | 6/1967 | Gulyas |
| 3,455,108 A | 7/1969 | Clare et al. |
| 3,722,216 A | 3/1973 | Bahr et al. |
| 3,727,409 A | 4/1973 | Kelley et al. |

(List continued on next page.)

FOREIGN PATENT DOCUMENTS

| | | |
|---|---|---|
| WO | WO 9827330 A1 | 6/1998 |
| WO | WO 0017492 A1 | 3/2000 |

Primary Examiner—Ted Kim
(74) Attorney, Agent, or Firm—R. Reams Goodloe, Jr.

(57) ABSTRACT

A rotary ramjet engine. A rotary ramjet engine is provided operating with a very low axial flow component. The engine has a closely housed rotor and shaft mounted for rotary motion with respect to an engine case. A plurality of ramjet combustors are provided at the periphery of the rotor, and a set of spaced apart helical strakes are provided extending outward from the surface portion of the rotor toward the interior wall of the engine case, less a running clearance therefrom. A centerbody is provided for each ramjet inlet. The centerbody is disposed along a helical axis parallel to the strakes, and includes a leading edge structure, opposing sidewalls, and a shaped cavity, and a rear end wall. Each set of strakes cooperate to define, rearward of the rear end wall of each inlet centerbody, a combustion chamber for mixing therewithin and inlet fluid and burning fuel therein to form hot combustion gases therefrom. A ramjet outlet nozzle structure, including a converging ramjet nozzle throat, and diverging ramjet nozzle are provided for receiving the hot combustion gases and discharging, at a preselected helical angle to the plane of rotation of the rotor, a jet of hot combustion exhaust gases. The hot combustion exhaust gases can be further utilized in an impulse turbine for extraction of kinetic energy, or in heat exchange equipment for recovery of thermal energy therefrom.

61 Claims, 14 Drawing Sheets

U.S. PATENT DOCUMENTS

| | | |
|---|---|---|
| 3,729,930 A | 5/1973 | Williams |
| 3,818,696 A | 6/1974 | Beaufrere |
| 3,864,907 A | 2/1975 | Curran |
| 3,880,571 A | 4/1975 | Koppang et al. |
| 3,971,209 A | 7/1976 | De Chair |
| 4,024,705 A | 5/1977 | Hedrick |
| 4,066,381 A | 1/1978 | Earnest |
| 4,197,869 A | 4/1980 | Moncrieff-Yeates |
| 4,350,009 A | 9/1982 | Holzapfel |
| 4,389,185 A | 6/1983 | Alpkvist |
| 4,455,839 A | 6/1984 | Wuchter |
| 4,586,443 A | 5/1986 | Burge et al. |
| 4,641,495 A | 2/1987 | Mowill |
| 4,702,073 A | 10/1987 | Melconian |
| 4,728,282 A | 3/1988 | May |
| 4,996,837 A | 3/1991 | Shekleton |
| 4,996,838 A | 3/1991 | Melconian |
| 5,025,622 A | 6/1991 | Melconian |
| 5,123,361 A | 6/1992 | Nieh et al. |
| 5,161,945 A | 11/1992 | Clevenger et al. |
| 5,372,005 A | 12/1994 | Lawlor |
| 5,372,008 A | 12/1994 | Sood |
| 5,619,855 A | 4/1997 | Burrus |
| 5,647,215 A | 7/1997 | Sharifi et al. |
| 5,657,632 A | 8/1997 | Foss |
| 5,709,076 A | 1/1998 | Lawlor |
| 5,791,148 A | 8/1998 | Burrus |
| 5,791,889 A | 8/1998 | Gemmen et al. |
| 5,809,769 A | 9/1998 | Richards et al. |
| 5,839,283 A | 11/1998 | Doobbeling |
| 5,857,339 A | 1/1999 | Roquemore et al. |
| 5,983,622 A | 11/1999 | Newburry et al. |
| 6,082,111 A | 7/2000 | Stokes |
| 6,263,660 B1 | 7/2001 | Lawlor |
| 6,279,309 B1 | 8/2001 | Lawlor et al. |
| 6,286,298 B1 | 9/2001 | Burrus et al. |
| 6,286,317 B1 | 9/2001 | Burrus et al. |
| 6,295,801 B1 | 10/2001 | Burrus et al. |
| 6,334,298 B1 | 1/2002 | Aicholtz |
| 6,334,299 B1 | 1/2002 | Lawlor |
| 6,374,615 B1 | 4/2002 | Zupanc et al. |
| 6,481,209 B1 | 11/2002 | Johnson et al. |
| 2002/0112482 A1 | 8/2002 | Johnson et al. |

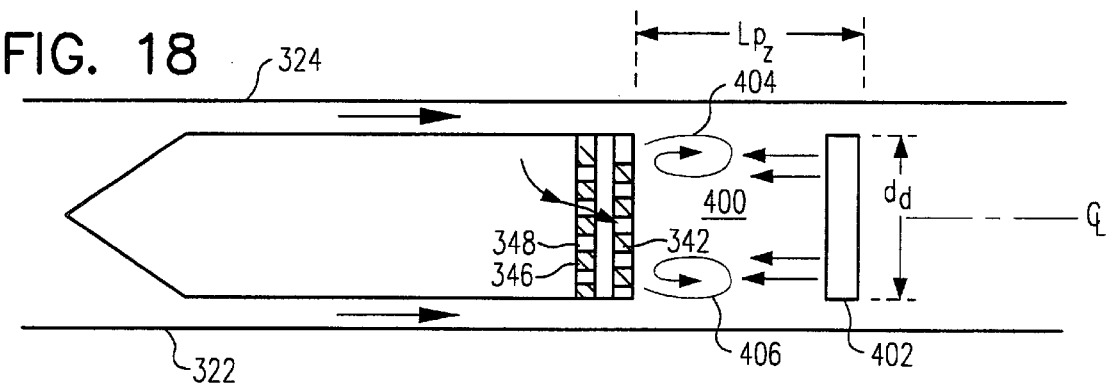
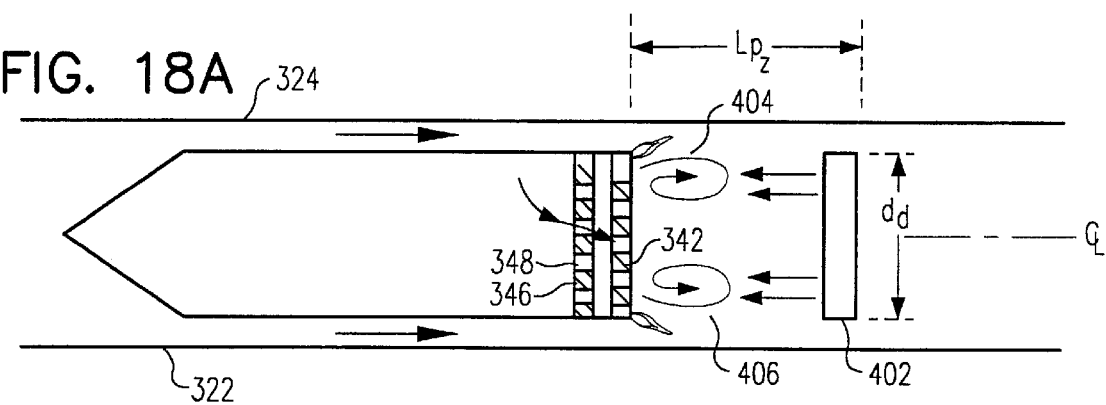
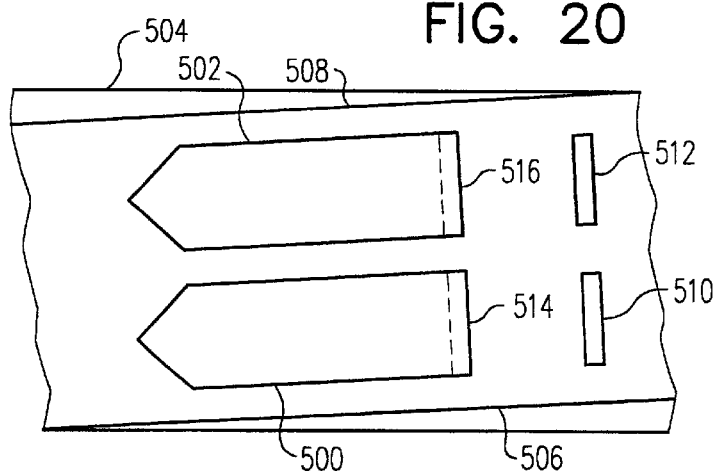

ROTARY RAMJET ENGINE WITH FLAMEHOLDER EXTENDING TO RUNNING CLEARANCE AT ENGINE CASING INTERIOR WALL

This application claims the benefit of U.S. Provisional Application Serial No. 60/386,195 filed Jul. 23, 2001 from originally filed Non-Provisional Application U.S. Serial No. 09/912,265 filed on Jul. 23, 2001.

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This invention is related to my U.S. Provisional Patent Application 60/386,195 converted from prior U.S. patent application Ser. No. 09/912,265, filed on Jul. 23, 2001, entitled Rotary Ramjet Engine With Flameholder Extending to Running Clearance At Engine Casing Interior Wall, the disclosure of which is incorporated herein in its entirety by this reference.

TECHNICAL FIELD

This invention relates to the field of combustion technology. More particularly, the invention relates to the design of a ramjet inlet and combustion chamber for a rotary ramjet engine, as well as to a method of operating such engines.

BACKGROUND

Over the years, aero-derivitive gas turbine engines have been successfully adapted for use in stationary power generation devices. However, improvements in overall cycle efficiency, necessary in order to reduce fuel cost, and reductions in complexity of generation devices, necessary in order to reduce maintenance costs, would still be desirable. Historically, various unconventional gas turbine designs have also been attempted. One such design was suggested by Campbell, in U.S. Pat. No. 3,557,551, issued Jan. 26, 1971, showing a gas turbine engine with rotating combustion chambers and high nozzle velocities. However, that device, like many others, did not adequately address the aerodynamic features necessary to reduce parasitic "$\int PdA$" drag (i.e., aerodynamic pressure P acting over an exposed area A), or the friction drag of high speed rotating elements, to within tolerable limits in order to economically deploy such technology at higher (e.g., supersonic) inlet velocities.

Further, although there have been various attempts at developing an apparatus that incorporates the use of ramjet engines for the production of stationary power, most of such designs as taught by others have been practically incapable of operation at supersonic speeds, or were potentially capable of such operation only at low Mach numbers and with considerable aerodynamic drag losses. Even where the use of ramjets operating at supersonic speeds and employing the use of oblique shock wave compression were envisioned, such as in Price, U.S. Pat. No. 2,579,049, such devices were inherently inefficient for stationary power production, since such designs were based on axial flow devices, where the bulk of the flow field occurs along the shaft axis, rather than on a tangential flow device, where the bulk of the flow field and therefore the thrust is oriented tangential to the rim of a rotor.

To provide a ramjet engine realistically adapted to stationary power production, it is desirable, particularly in locales with strict environmental regulations, to provide a device in which undesirable combustion products are reduced. Thus, it would be desirable to provide a ramjet inlet, and more particularly, a supersonic ramjet inlet and the accompanying combustion chamber structure, that enables the engine to maintain high efficiency power output while reducing the generation of undesirable products of combustion (such as nitrogen oxides) or incomplete products of combustion (such as carbon monoxide).

Moreover, it is beneficial in such devices that parasitic drag be decreased, to increase overall efficiency, and thus decrease specific fuel consumption. Thus, it would be desirable that both the axial and the tangential fluid flow fields, at both the engine inlet and at the engine exhaust, as well as with respect to engine components located in the fluid flow path therebetween, be substantially matched such that, particularly at full load design conditions, the engine operates with high efficiency.

Depending upon the specific operating needs of a particular implementation, certain subsets of (or even all) of the foregoing can be implemented using various combinations of exemplary embodiments and aspects thereof described in the sections following.

SUMMARY

One embodiment of a novel rotary ramjet engine design disclosed herein has a combustor configuration in which a flameholder is provided that extends toward the running clearance at a stationary, preferably substantially cylindrical tubular peripheral wall. This design preferably utilizes an inlet centerbody in which ramjet compression is achieved at supersonic inlet velocities, by exploiting an oblique shock extending from a leading edge structure laterally outwardly to, at the design velocity, confining inlet and outlet strakes. Preferably, the combustor and accompanying strakes are affixed to the rotor in a preselected, substantially matched helical angle orientation, so as to smoothly and continuously acquire clean inlet air and discharge the resulting products of combustion. The combustion chamber is simplified in that a rear wall of the inlet centerbody serves as a forward wall of a combustion chamber, providing for flame holding. By virtue of the rear wall of the inlet centerbody extending from the rim of the rotor outward to the cylindrical interior peripheral sidewall (less running clearance), a combustor cavity is defined to provide for thorough mixing of fuel and air, and to provide sufficient residence time for reaction of fuel with oxidant in order to minimize the escape of incomplete combustion products from the combustor.

The foregoing combustion chamber configuration provides for efficient mixing of fuel and air at supersonic inlet inflow velocities. As stated previously, this combustor flameholder extends outward from the rim of the rotor toward the stationary, substantially cylindrical tubular interior peripheral wall (less running clearance). In this manner, by the utilization of a rear wall of an inlet body, multiple shear layers are created, i.e., on both sides of the inlet centerbody, so that fuel/air mixing is improved. The shear layers lead to the creation of mixing vortices behind the rear wall of the inlet centerbody (i.e., within the flameholder), which provides for a more compact primary zone and for stable flameholding that is desirable at the design operational velocity. A still further feature is provided by an embodiment incorporating multiple inlet centerbodies, wherein multiple flameholders are utilized.

Further, it is to be understood that although a combustor cavity having roughly a segmented annulus shape and having a substantially rectangular cross-section at any selected station along the flow path is depicted, other designs utilizing an inlet body rear wall flameholder shape other than that just described are also possible (e.g., non-rectangular cross-sectional shape). However, by optimizing combustor volume, the "hot section" components of the ramjet engine are reduced.

In another embodiment, a fuel/air mixture may be supplied at high velocity via inlet fluid compression ducts adjacent to the inlet centerbody, so that flashback from the combustor may be reliably avoided even in the case of fuels that have a very high flame velocity. Such a the high velocity inlet can also acoustically decouple the upstream fuel system acoustics from the combustion chamber acoustic perturbations. Thus, combustion may be more easily confined to the mixing zones behind the flameholder, i.e., the rear wall of the inlet centerbody.

Yet another aspect may involve matching the axial and tangential flows at the inlet inflow plane and at the exhaust outlet nozzle, providing a primarily tangential flow engine with reduced energy loss due to unmatched flow rates, or due to excess or unnecessary axial flow.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 4 illustrates the operation of an inlet centerbody at design conditions, which, for one preferred embodiment, is Mach 2.75.

FIG. 5 illustrates the operation of an inlet centerbody at moderate speed off-design conditions, e.g., at about Mach 2.0.

FIG. 6 illustrates the operation of an inlet centerbody at low speed off-design conditions, e.g., at about Mach 1.5.

FIGS. 15, 16, 17, and 18 illustrate various enhanced embodiments of a novel combustor design for a stationary rotary ramjet engine. FIGS. 15A, 16A, 17A, and 18A illustrate the same combustor designs as in FIGS. 15, 16, 17 and 18, but enhanced with the use of a pilot flame. In each of the just mentioned figures, use of both impingement and effusion cooling of the rear wall are shown.

In FIG. 15, the combustor design utilizing a simple bluff body, as earlier shown in FIG. 7, is now shown enhanced with respect to required cooling load, with the combination of impingement and effusion cooling on the flameholder.

In FIG. 16, the combustor design is further enhanced via use of side ramps to increase the flame holding surface area and to encourage higher combustion intensity in the primary zone.

In FIG. 17, the combustor design is further enhanced via use of flow splitting devices to enhance mixing through the impingement of multiple transverse jets via the action of side skirts and side ramps.

In FIG. 18, the combustor efficiency is further enhanced via use of a trapped vortex design, which locks stationary vortices between the fore and aft bodies, and enhances primary air entrainment through the pumping of secondary airflow into the primary zone.

FIG. 20 illustrates the use of multiple inlet centerbodies in a ramjet inlet, where in two or more centerbodies are located between an inlet strake and outlet strake.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the rotary ramjet engine are also shown and briefly described to enable the reader to understand how various optional features may be utilized in order to provide an efficient, reliable engine.

DETAILED DESCRIPTION

Figure 1:
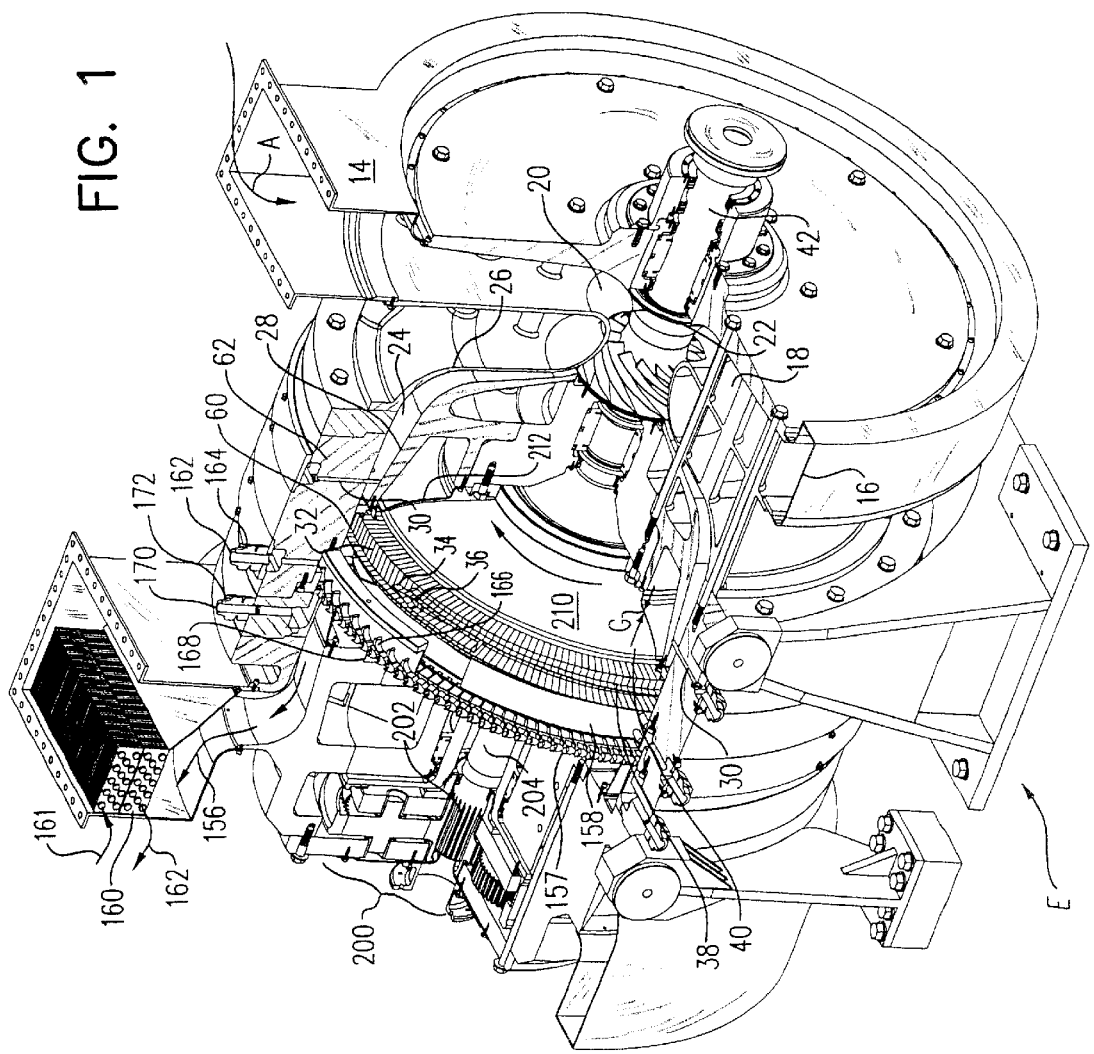
FIG. 1 shows a partially sectioned perspective view of a rotary ramjet engine having an inlet centerbody for lateral compression of inlet fluid, and a combustion chamber with a rear wall flameholder extending to the stationary peripheral circular wall (less running clearance).
Figure 10:
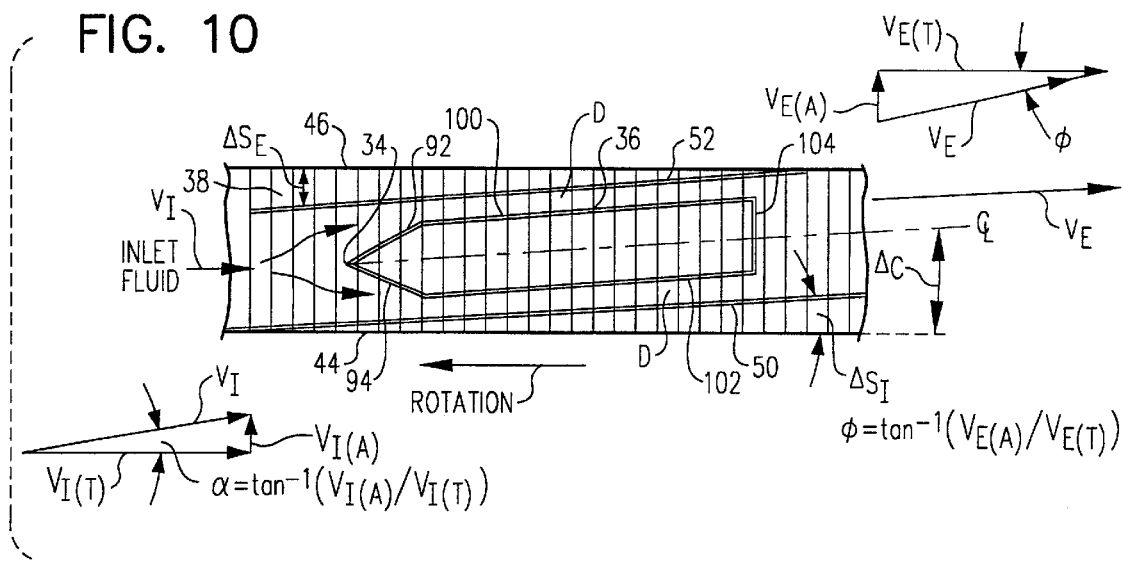
FIG. 10 illustrates the inlet and exhaust velocity vector triangles for the rotary ramjet employed in the ramjet engine design disclosed herein.

A detailed view of an exemplary embodiment of a rotary ramjet engine E is provided in FIG. 1. Inlet air as indicated by reference letter A is supplied via inlet duct 14 to a circumferential inlet air supply plenum 16 and thence through radial air inlet 18 for supply to a pre-swirl compressor inlet 20. From inlet 20, a pre-swirl compressor 22 provides compression of the inlet air A from inlet pressure to a desired superatmospheric pressure sufficient to create the desired relative inlet velocity between the rotating ramjet inlet and the inlet air or fuel/air premix stream. In a preferred embodiment, the compressed inlet air (or fuel/air premix) is allowed to decelerate in a diffuser portion 24 of pre-swirl compressor outlet duct 26, to build a reservoir of low velocity pressurized inlet air. Subsequently, portion 28 of outlet duct 26 supplies pressurized air to the inflow plane of the air inlet. Primary fuel is supplied at injectors 30. Then, the resultant fuel air mixture is deflected and expanded by inlet guide vanes 32 (of which only one guide vane 32 in the guide-vane row is shown in FIG. 1) to provide both axial and tangential ramjet inlet velocities as required to produce, at design conditions, a negligible inflow angle of attack at the leading edge 34 of the ramjet inlet centerbody 36. This is illustrated in additional detail in FIG. 10, where a desirable design aspect of substantially matching the resultant vectors of the inlet fluid $V_I$ flow and the exhaust gas flow $V_E$ is further depicted. Fundamentally, this rotary ramjet engine E acts on an air mass having two basic flow field components—namely an axial flow component (along the longitudinal shaft axis), and a tangential flow component (along the plane of, and tangential to, the rim 38 of the rotor). For example, the inlet fluid stream $V_I$ has a tangential velocity $V_{I(T)}$, i.e., the rim speed of the rotor 40 in front of the leading edge 34 of ramjet inlet centerbody 36, and an axial velocity $V_{I(A)}$, along the longitudinal axis of shaft 42, from the rotor inlet edge 44 to the rotor exhaust edge 46. The velocity vector triangles illustrated in FIG. 10 show the relationship between the axial and tangential fluid flow fields. At the inlet, the angle alpha ($\alpha$) at which the inlet fluid proceeds at a velocity of $V_I$ is substantially equal to the inverse tangent of the ratio of the axial velocity of the inlet fluid $V_{I(A)}$ to the tangential velocity of the inlet fluid $V_{I(T)}$:

$$\tan(\alpha) = \frac{V_{I(A)}}{V_{I(T)}};$$

Likewise, at the outlet, the angle theta (I) which the exhaust gas stream proceeds at a velocity of $V_E$ is substantially equal to the inverse tangent of the ratio of the axial velocity of the exhaust gas $V_{E(A)}$ to the tangential velocity of the exhaust gas $V_{E(T)}$:

$$\tan(\phi) = \frac{V_{E(A)}}{V_{E(T)}};$$

Figures 11, 11A:
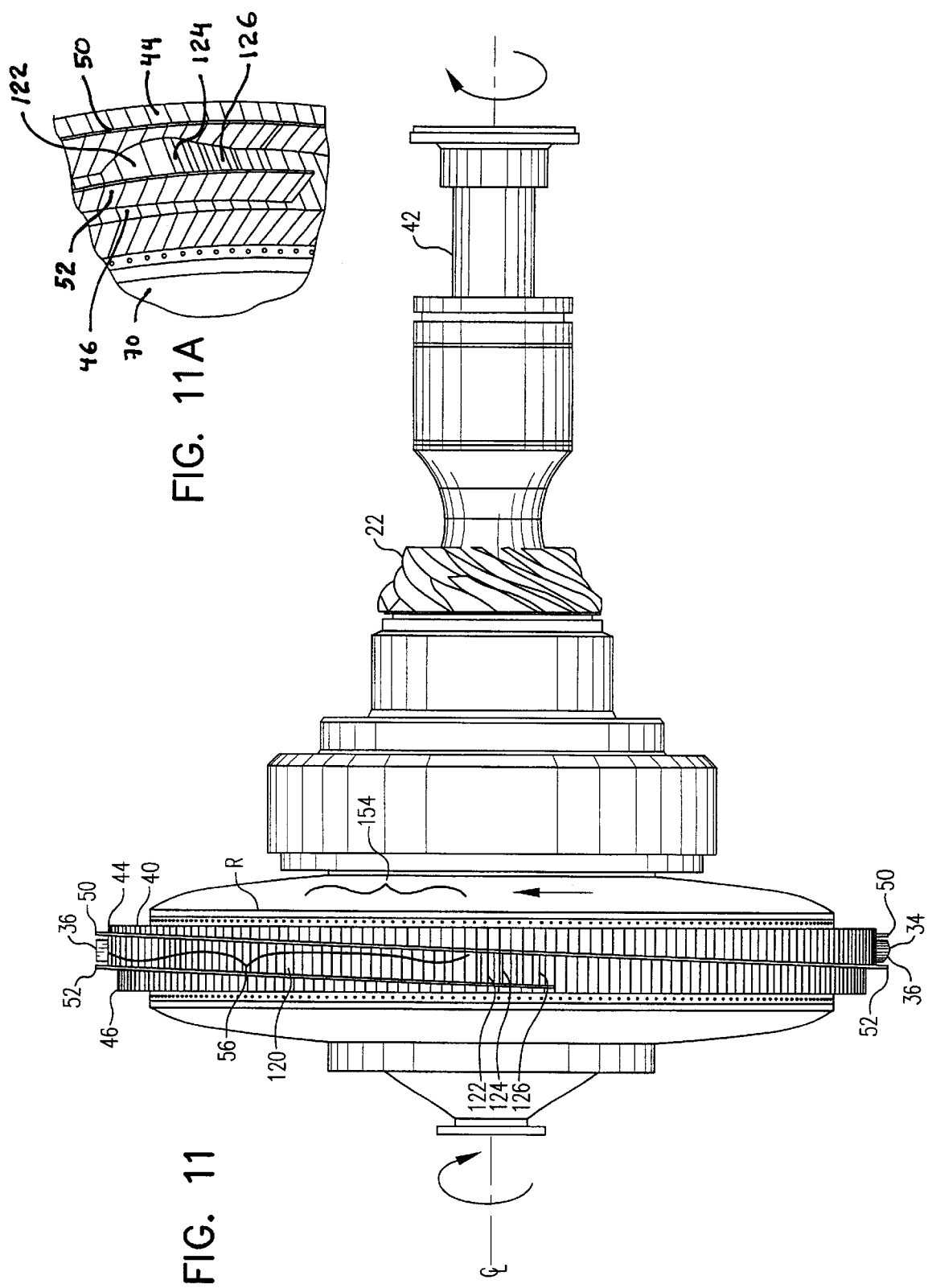
FIG. 11 illustrates a side view of a ramjet hot section rotor cartridge, illustrating the full circumferential length of the combustor chamber, and also showing the ramjet outlet nozzle.
FIG. 11A illustrates the detail of a ramjet outlet nozzle region.

Further, in a preferred embodiment, the angle alpha ($\alpha$) of the inlet fluid matches the angle theta ($\phi$) of the exhaust gas (in the moving reference plane) at design conditions. In such a case, the inlet and exhaust strakes 50 and 52, respectively, are preferably offset at an angle from the plane of rotation R of the rotor 40 at the same matching angle, i.e, they are parallel, as noted in FIG. 11. This is further depicted in FIG. 10 as angle delta ($\Delta$)$S_I$ for the inlet strake 50, and as angle delta ($\Delta$)$S_E$ for the exhaust strake 52. Likewise, the inlet centerbody structure 36 is preferably offset at the same matching angle (i.e., the centerline CL of the centerbody structure is offset at the same matching angle), and thus the ramjet has a negligible angle of attack. This is depicted as angle delta ($\Delta$)C for the inlet centerbody structure in FIG. 10. Although a variety of designs can be developed utilizing the teachings hereof, it has been found that substantially conforming angles alpha, theta, and delta $S_I$, delta $S_E$, and delta C is advantageous. For the exemplary design conditions depicted herein, those angles are preferably conformed in the range from more than zero up to about 15 degrees; more preferably from more than zero up to about 10 degrees, is advantageous. For an exemplary design point of about Mach 2.75 with respect to the relative velocity of inlet air to the leading edge 34, these angles are in one embodiment in the 1 degree to 5 degree range, and may, in such embodiment be in the 1 degree to 2 degree range, and in one exemplary embodiment, may be established at about 1.5 degrees, and may be more precisely established at about 1.554 degrees. More specifically, in producing a negligible inflow angle of attack for a rotary ramjet engine operating around such Mach number, the inlet axial velocity would be about 82 feet per second, and inlet tangential velocity would be about 3076 feet per second. At the outlet, the exhaust axial velocity would be about 131 feet per second, and the exhaust tangential velocity would be about 5005 feet per second (in the rotating frame of reference). In this way, both the inlet flow vector angle alpha and the exhaust flow vector angle theta are about 1.5 degrees. Accordingly, the inlet strake 50 angle delta $_{SI}$ and the outlet strake 52 angle delta$_{SE}$ are set at about 1.5 degrees. More specifically, in one embodiment of our exemplary 800 kW rotary ramjet engine design, the inlet strake angle delta $_{SI}$ is 1.554 degrees. The matched velocity vector technique enables the inlet fluid to be supplied with minimal pressure loss, viscous fluid flow complications, or parasitic power losses. Moreover, for a given ramjet rotor speed, increasing the amount of positive pressure provided by the pre-swirl impeller results in an increased tangential velocity component entering the plane of rotation of the ramjet rotor, and an increase in the inlet inflow Mach number, and thus an increased ramjet cycle compression ratio.

Figure 2:
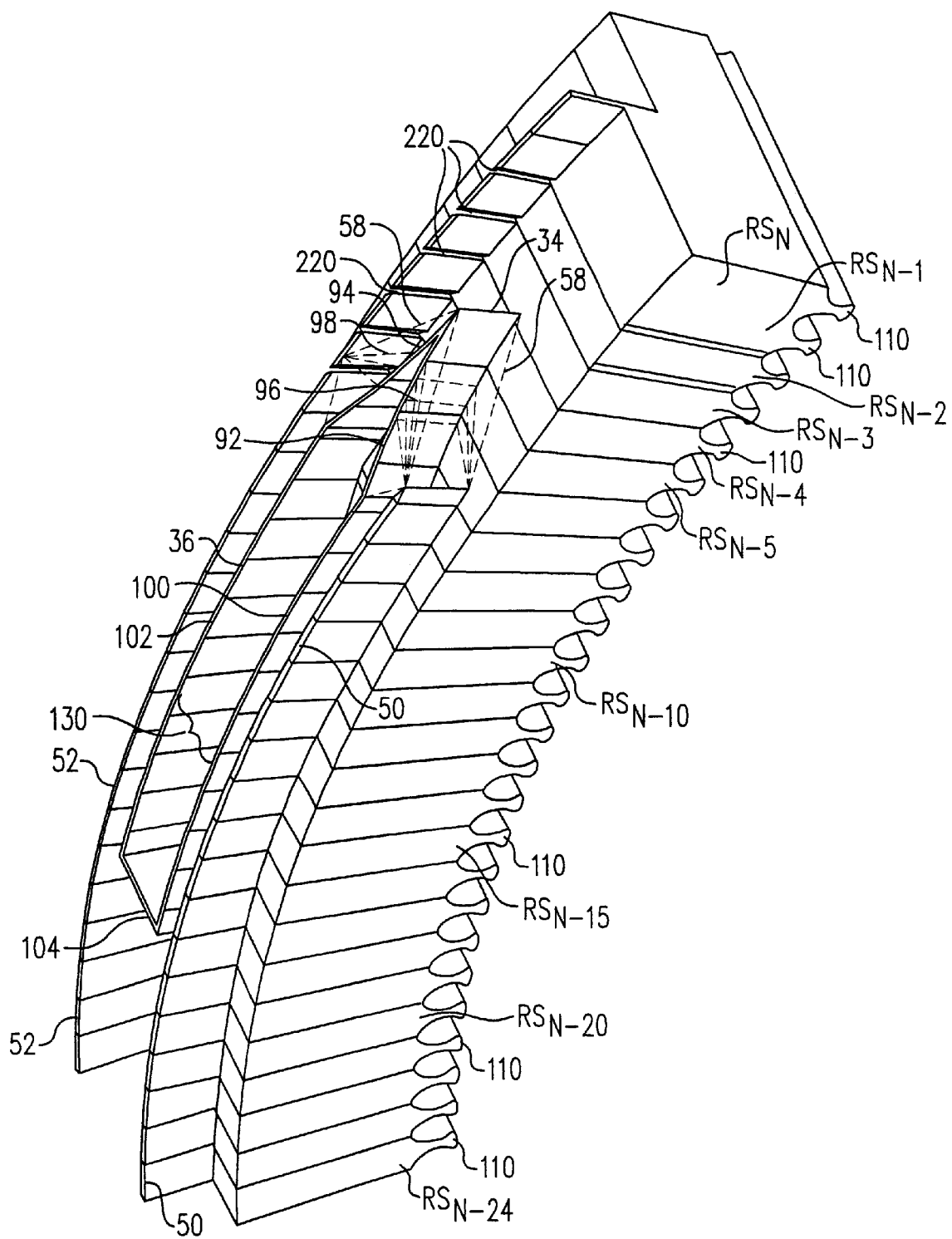
FIG. 2 shows a detailed perspective view of a set of rim segments, detached from a rotor, illustrating one inlet centerbody design, here using a pentagon shape, and showing in broken lines the shock pattern at supersonic design conditions, illustrating how the shock structure is contained between an inlet strake and an exhaust strake, after reflection from the leading edge structure of the inlet centerbody.
Figure 3:
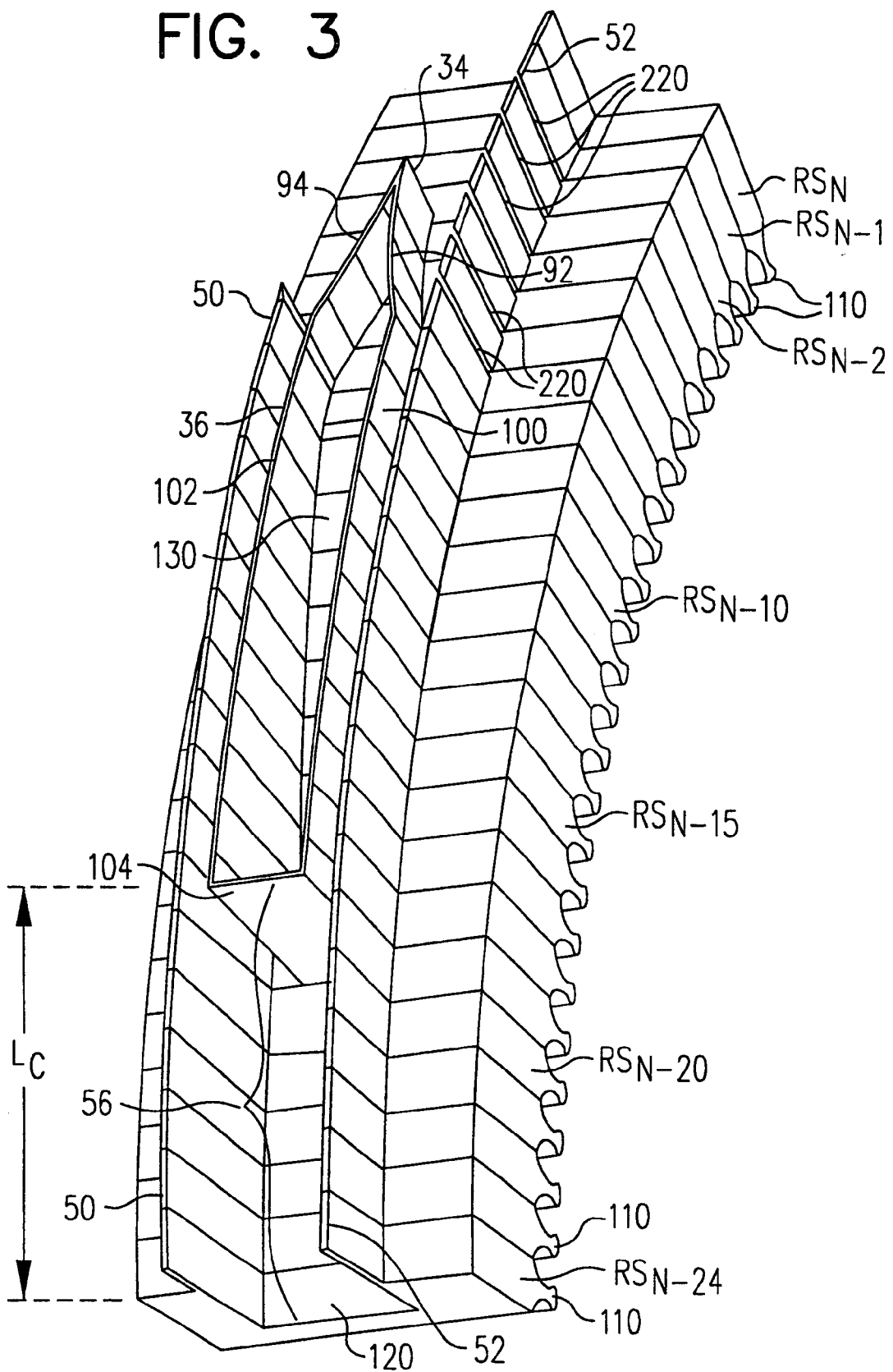
FIG. 3 is a detailed perspective view of a set of rim segments, detached from a rotor, illustrating the inlet centerbody design similar to that of FIG. 2, but now showing the construction of the rear wall of the inlet centerbody and the combustion chamber extending rearwardly therefrom.
Figure 4:
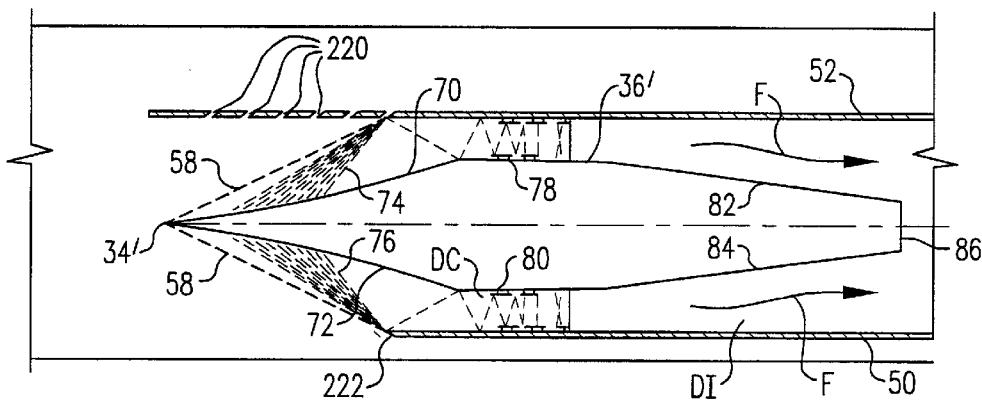
FIGS. 4, 5, and 6 illustrate a method of operating the rotary ramjet engine at design conditions, and the resultant shock wave patterns, using a substantially polygonal shaped centerbody, such as a seven sided centerbody design.
Figure 5:
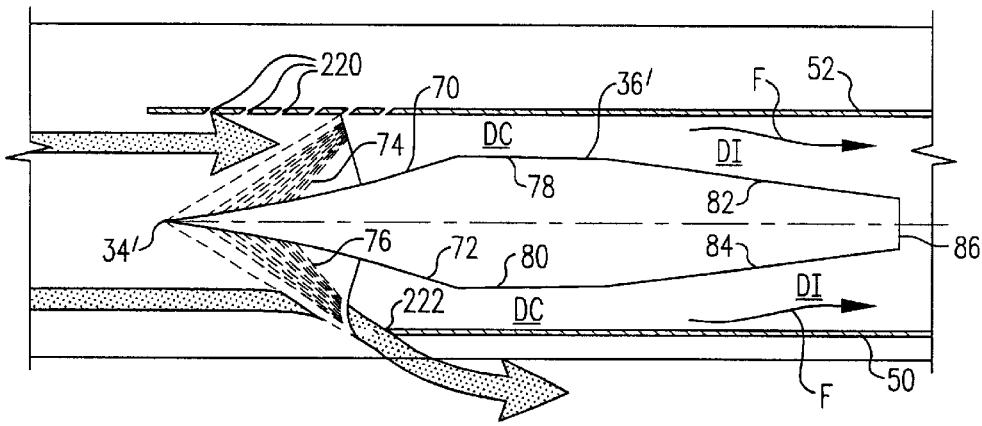
Figure 6:
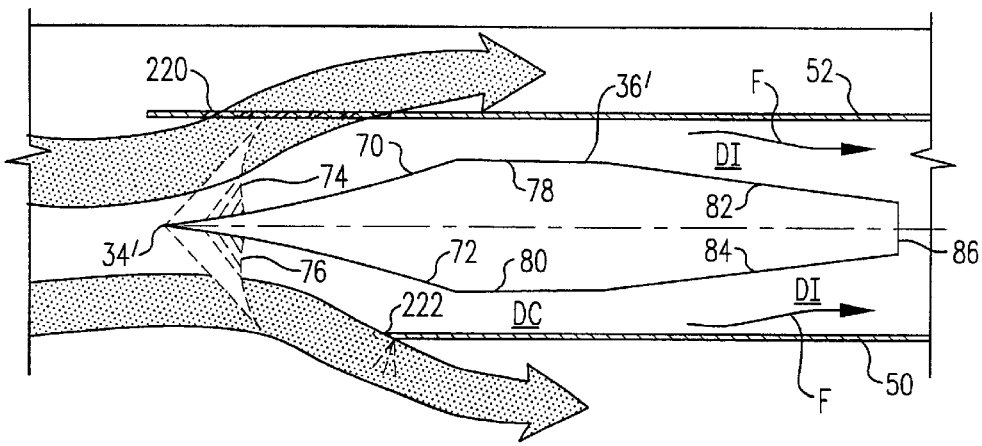
Figure 7:
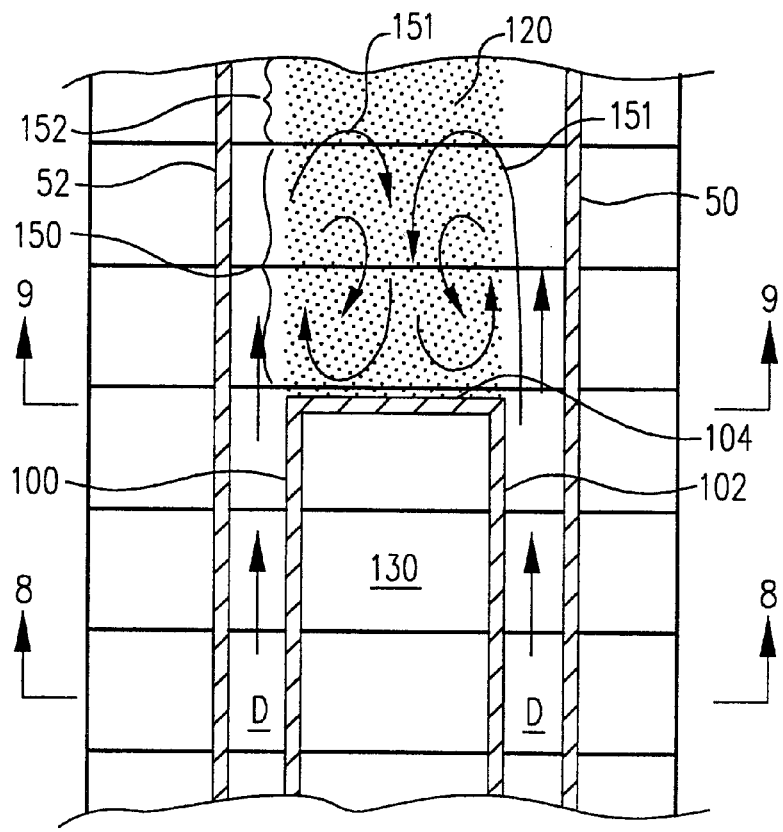
FIG. 7 shows a circumferential view, looking down on a set of rim segments which incorporate therein an inlet strake, and outlet strake, and an inlet centerbody design having a rear wall flame stabilizing structure, and further showing the combustion zone in the shaded area, and recirculation and fuel/air mixing zone with various reference arrows.

The supersonic ramjet inlet utilizes the kinetic energy inherent in the air mass due to the relative velocity between the ramjet inlet and the supplied air stream, depicted as $V_I$ in FIG. 10, to compress the inlet air (or, alternately, the inlet fuel/air mixture), preferably via an oblique shock wave structure, as depicted in FIGS. 2, 3, and 4. As illustrated herein, in order to carry out reliable, thorough combustion in the combustion chamber 56, the inlet stream is compressed utilizing a flow pattern operating with compression primarily laterally with respect to the plane of rotation of the rotor, via an oblique shock compression fan 58 (see FIGS. 2, 4, 5, and 6), to compress the inlet fuel/air mix between the inlet centerbody 36 and adjacent inlet strake 50 and outlet strake 52 structures. Of course, as can be appreciated from FIGS. 1, 8, and 9, the compressed inlet fuel/air mix is also contained by the substantially cylindrical tubular interior sidewall portion 60 of the engine casing 62. After compression, the compressed inlet fluid stream is preferably maintained at a very high velocity through a constant area supersonic diffuser D, as shown in FIGS. 7 and 10. Optionally, as indicated in FIGS. 4, 5, and 6, an at least partially subsonic diffuser DI having increasing diffuser cross-sectional area may be provided rearward of a leading edge 34' and more precisely, rearward flow-wise of a constant area diffuser DC, as shown in the alternate inlet center body structure 36'. This alternate inlet centerbody structure 36' design as illustrated in FIGS. 4, 5, and 6 provides a seven sided structure, having an inlet leading edge 34', a pair of compression sidewalls 70 and 72 that project shock waves 74 and 76 laterally outward, a pair of constant area diffuser DC walls 78 and 80, a pair of increasing area diffuser DI walls 82 and 84, and a rear wall 86 which operates as a flameholder. Note that the use of the increasing area diffuser DI as provided by the ramjet inlet centerbody 36' design still further reduces the velocity of the inlet fluid stream, indicated by reference arrows F in FIGS. 4, 5,and 6, before it reaches the combustion chamber 56 itself. In the ramjet inlet centerbody 36 design shown in FIGS. 1, 2, 3, 7 and 10, the centerbody 36 is of a pentagon design, with leading edge 34, a pair of compression sidewalls 92 and 94 that project shock waves 96 and 98 laterally outward, a pair of opposing sidewalls 100 and 102 that also operate with inlet 50 and exhaust 52 strakes to define a constant area diffuser D, and a rear wall 104 that operates as a flameholder for the combustion chamber 56. As noted in FIG. 9, a running clearance $C_{104}$ is provided between the top 105 of rear wall 104 and the interior sidewall portion 60 of engine casing 62. For the particular operating conditions depicted herein, the value of this running clearance is about 0.025 inches, although those skilled in the art will appreciate that the value will differ for other operating conditions. Similarly, at these exemplary operating conditions:

a running clearance $C_{50}$ of about 0.005 inches to about 0.010 inches is provided between the top 106 of outlet strake 50 and the interior sidewall portion 60 of engine casing 62;

a running clearance $C_{52}$ of about 0.005 inches to about 0.010 inches is provided between top 108 of outlet strake 52 and the interior sidewall portion 60 of engine casing 62.; and the sidewalls 100 and 102 of inlet centerbody 36 have height $H_{100\ and\ H102}$, respectively, and a running clearance of $C_{100}$ and of $C_{102}$, respectively, of about 0.025 inches each.

In the exemplary rotary ramjet engine implementation described herein, although the ramjet configuration superficially resembles those previously attempted in supersonic gas turbine systems that attempted to utilize ramjet engine techniques, in the rotary ramjet engine shown herein, the compression and combustion is achieved utilizing only a small number of ramjets, (preferably expected to be in the range from 2 to 5 total, with accompanying inlet and outlet strakes for each ramjet), and within an aerodynamic duct formed by the spirally disposed, or more specifically, helically disposed inlet and outlet strakes, as opposed to a traditional gas turbine or other axial flow compressor using many rotor and stator blades.

In an exemplary method of construction illustrated herein, a method of constructing the inlet strakes 50, exhaust strakes 52, inlet centerbody 36, and related rotating parts including rim portions of the rotor, are shown manufactured as individual rim segments RS, a plurality N (where N is a positive integer, preferably of more than 100, depending on the size of the rotor 40) of which taken in a group comprising the series of rim segments from $RS_1$ to $RS_N$, together provide the various structures discussed above. As indicated in FIGS. 2 and 3, one method of attachment of each of the rim segments RS to the rotor 40 is via use of dove tail shaped features 110 on each rim segment RS; these features interlock with complementary features on the rotor 40.

Any single rim segment $RS_X$ (where X is any number from 1 to N) may comprise an inlet strake 50 portion, an outlet strake 52 portion, or both, and may further comprise, alternately, one or more inlet centerbody 36 portions, a combustor floor 120 portion, a converging portion 122 of a ramjet outlet nozzle, a ramjet-nozzle/throat 124 portion, or the diverging portion 126 of a ramjet outlet nozzle. Various elements of such construction can be easily appreciated from a review of FIGS. 2, 3, and 7 through 10. As also seen in FIGS. 2 and 3, it is not necessary to provide structure for an interior of inlet centerbody 36, as a quiescent zone 130 can be provided interior to the above described components which comprise the centerbody 36 structure.

In situations where environmental concerns are significant, in order to obtain the proper conditions for combustion while producing low-pollution products of combustion, the fuel and combustion air may be premixed prior to feed to the ramjet inlet. As illustrated in FIG. 1, fuel injectors 30 add the fuel to an inlet fluid (which may be either be a fuel free oxidant containing stream, or which may contain some high value fuel such as hydrogen, or some low value fuel, such as coal bed methane, coal mine purge gas, landfill methane, biomass produced fuel gas, sub-quality natural gas, or other low grade fuels) provided through diffuser 24. In order to carry out the actual combustion step in an operationally reliable manner, the velocity of the compressed inlet fuel/air mixture should preferably be high at the intermixing point between the combustion chamber and the delivery point of the combustible fuel/air mixture, so that flashback of the flame front from the combustor toward the inlet is reduced or avoided. In the exemplary rotary ramjet engine described herein, when operated at the exemplary conditions described herein, the residence time in the diffuser is too short to initiate an auto-ignition process in the prescribed residence time. Further, the aerodynamics of the diffuser design and of the inlet section are not conducive to flame holding.

Figure 8:
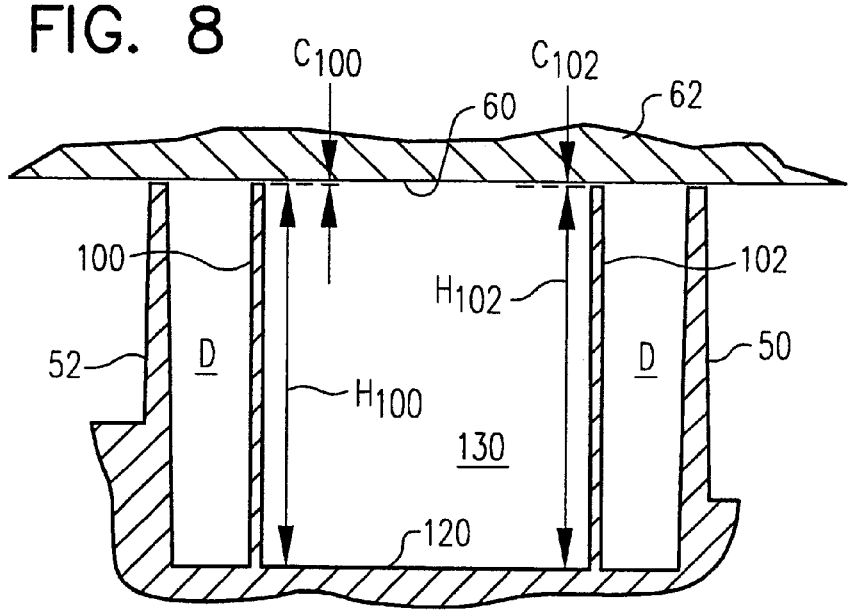
FIG. 8 shows a sectional view of a rim segment, taken along line 8—8 of FIG. 7, which illustrates the inlet and outlet strakes, and a pair of sidewalls of an inlet centerbody.
Figure 9:
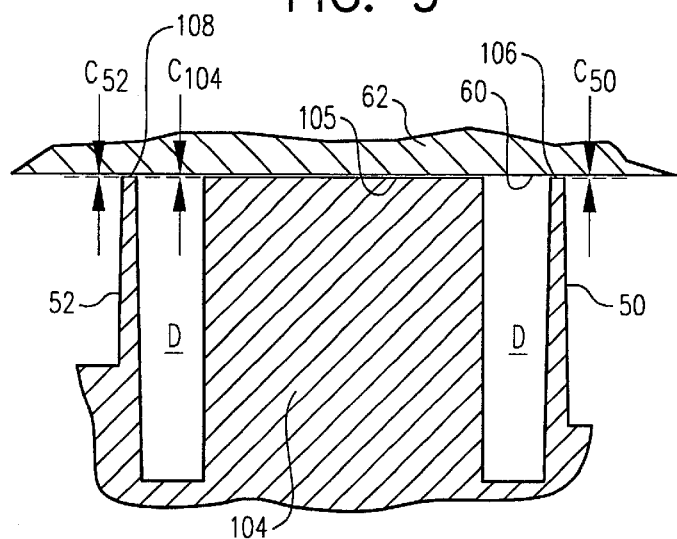
FIG. 9 shows a sectional view of a rim segment, taken along line 9—9 of FIG. 7, which illustrates the rear wall of the inlet centerbody (i.e, the combustion chamber front plate), extending outward to the stationary circular peripheral wall (less running clearance).

In order to stabilize the combustion process downstream of the rear wall 104 of ramjet inlet centerbody 36, may be stabilized by substantially reducing the velocity through the combustion chamber 56 by providing a combustion chamber 56 having substantially larger cross-sectional flow area than provided by the inlet ducts thereto (for example, ducts D & D, as illustrated in FIGS. 7, 8, and 9. Localized recirculation zones may also be provided in order to have an adequate residence time to substantially minimize creation of carbon monoxide in the combustor, in order to bring the remaining CO in the exiting combustion gases to an environmentally acceptable low residual level. Overall, this configuration reduces the size of the primary zone by introducing a short flame front at the entrance of the combustor flow path. In the base design illustrated herein, a combustion chamber with a constant duct height and a predetermined overall length $L_C$ is provided (see FIG. 3). Preferably, this overall length $L_C$ is determined by providing a combustor residence time of about 5 ms to about 10 ms for the oxidation of CO to $CO_2$, based on equilibrium flame temperature calculations and current gas turbine industry practice. Of course, changes in industry practice or environmental regulations may require shorter or longer residence times. A ramjet exhaust nozzle is provided at the outlet of the combustion chamber 56, so that exhaust gas outlet velocity will propel the rotor 40 at the desired rim speed under design load conditions. Accordingly, in the ramjet configuration illustrated, the acceleration and deceleration of the inlet fluid, and the acceleration and deceleration of the outlet combustion gases, is accomplished efficiently.

Figure 12:
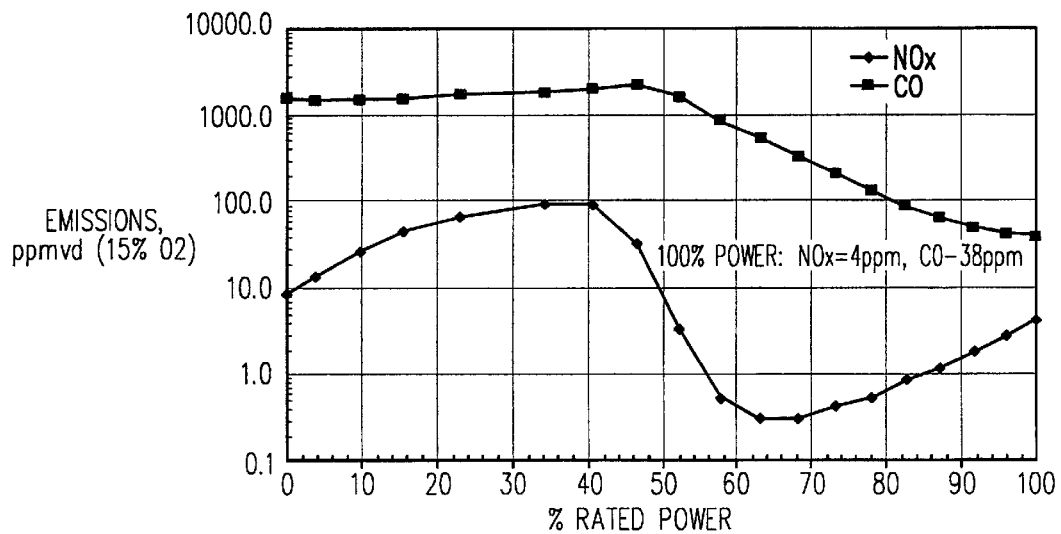
FIG. 12 is a graphical depiction, on a logarithmic scale, of the nitrogen oxides (NOx) and carbon monoxide (CO) emissions from a proposed 800 kW rotary ramjet engine, showing the emissions at full rotor speed as a function of percent of rated output power.

Emissions calculations for the combustor described herein, utilizing rear wall 104 of ramjet inlet centerbody as a flameholder extending to the running clearance at a cylindrical tubular engine casing interior peripheral wall 60 have been developed utilizing computational fluid dynamics to visualize the flowfield within the combustor. The calculated flowfield was then utilized to predict the emissions; such methods have been widely accepted in the gas turbine industry. Accordingly, three major flowfield zones were modeled: the recirculation zone 150 behind the rear wall 104 of the inlet centerbody 36, the shear layer zone 152 (seen at the downstream edges of the gray zone in FIG. 7), where the inflowing premixed fuel and air mixes with the burning gases from the recirculation zone, and the burnout zone 154 (see FIG. 11), which is located downstream from the recirculation zone 150 and shear layer 152 zones. For evaluation of a combustor in a proposed 800 kW engine size, the recirculation zone 150 was modeled as a perfectly stirred reactor. In this region, inlet fluid is decelerated to a suitable velocity level, and longitudinal (flow stream wise) vortices (see reference arrows 151 in FIG. 7) are generated at rearward of the rear wall 104 of the inlet body 36. Then, the shear layer 152 was modeled as a series of perfectly stirred reactors, to simulate the mixing of the inflowing air-fuel stream with the recirculation zone gases. The burnout zone 154 was then modeled as a plug flow reactor. The interaction or flow exchange among the various components was based on estimates predicted by the computational flow dynamics results. Finally, air-fuel combustion chemistry was simulated utilizing accepted methodology developed by the Gas Research Institute for modeling the combustion of natural gas. In FIG. 12, the projected emissions of an exemplary 800 kW rotary ramjet engine are shown, assuming operation at full rotor speed (as in synchronous electrical generator service) from idle to full load conditions. The full load condition emissions are projected at less than 5 ppm of NOx, and are actually expected at only 4 ppm of NOx and 36 ppm of CO, corrected to an $O_2$ concentration dry basis of 15 percent. Therefore, the rotary ramjet engine E with inlet centerbody 36 and combustor 56 design configuration illustrated herein provides emission results which are well within the range of measured NOx and CO data from various lean pre-mixed, gas turbine and laboratory combustors that were operating under conditions similar to that of the proposed 800 kW engine at full load. Overall, for this exemplary combination of engine size and operating conditions, NOx is maintained below 100 ppm, and more preferably below 50 ppm, and yet still preferably at less than 25 ppm, and ideally below 10 ppm, and more ideally below 9 ppm. Projections of NOx below 5 ppm, and even at 4 ppm, when achieved in practice, will provide outstanding benefits to the operator of the equipment.

Returning now to FIGS. 1 and 11, the hot exhaust gases 156 (products of combustion), directly after discharge from the combustion chamber, flow through the ramjet outlet nozzle 124, and thence along the outlet strake 52, and are directed, preferably at low pressure but still containing axial and tangential swirl kinetic energy to exhaust gas blades 157 in an impulse turbine 158, for extraction of the kinetic energy based on the overall swirl energy inherent in such hot exhaust gases 156. Finally, in one embodiment (for enhanced efficiency), the hot exhaust gases 156 may be further utilized by being directed to an exhaust heat exchanger 160 to heat condensate 161 and produce steam 162. The steam 162 can optionally be directed through high-pressure steam supply nozzles 164 and thence through inlet vanes 166, preferably fixed in orientation, and thence into the steam blades 168 in the impulse turbine, for added energy recovery. Subsequently, low pressure steam 170 is exhausted from the impulse turbine 158 via steam discharge nozzles 172 and is directed to a condenser (not shown) and pumped to the heat exchanger 160 for replenishment of the supply of high pressure steam 162 to be sent to the high pressure steam supply nozzles 164 mentioned above.

Returning now to FIG. 1, note that in order to match optimum tangential speed of rotor 40 and the desired rotational speed of impulse turbine 158, a planetary gear system 200 is used for transmission of power from the impulse turbine 158 to a geared spline 202 on output shaft portion 204. The impulse turbine 158 is not directly affixed to, and turns at a different speed and direction than rotor 40. Additionally, it should be noted that in order to minimize aerodynamic drag and efficiently operate the outer portions of the rotor 40 at supersonic tangential velocities, means can be provided to reduce drag of the rotor. This can take the form of a fixed housing with a small interior gap G between the rotor surface 210 and an interior housing 212, or, alternately, take the form of a vacuum means to remove air from adjacent the rotor. Some rotor drag minimizing techniques are taught in U.S. Pat. No. 5,372,005, issued Dec. 14, 1994 to Lawlor, the disclosure of which is incorporated herein by this reference.

FIGS. 4, 5, and 6 schematically illustrate how the inlet fluid spill in a proposed 800 kW engine design transitions from a high spillage condition at low inflow Mach number (FIG. 6) to lower spill levels at increasing inflow (FIG. 5), and finally to no spill when the shock 58 on inlet strake 50 lip 222 design condition is achieved (FIG. 4). Spillage occurs in front of the intake strake 50, and through a plurality of slots 220 in the exhaust strake 52. This inlet spillage mechanism enables the inlet to smoothly and continuously transition from operating in a fully un-started, normal shock mode to a fully started condition with full inlet shock capture. Of course, when the inlet is operating at inflow Mach numbers below the design Mach number, and the inlet is spilling, aerodynamic drag occurs due to the spillage process, which drag is accounted for in the system starting characteristics, and startup power is provided accordingly.

Attention is now directed to FIGS. 13 through 19, where yet further improved combustor designs are illustrated. For comparison purposes, in FIG. 13, a cross-sectional view of a prior art ramjet burner design for a stationary, rotary ramjet engine is illustrated, showing a rotor 300 having at the outer reaches thereof a ramjet burner section 302 having a flameholder 304, rearward of which, flow-wise, is a single, long flame front 306, behind which hot combustion products 308 circulate. The flame front 306 spreads outward until contacting the adjacent stationary peripheral wall 310. In that prior art design, a relatively long primary mixing zone "$L_1P_z$" results.

Figure 13:
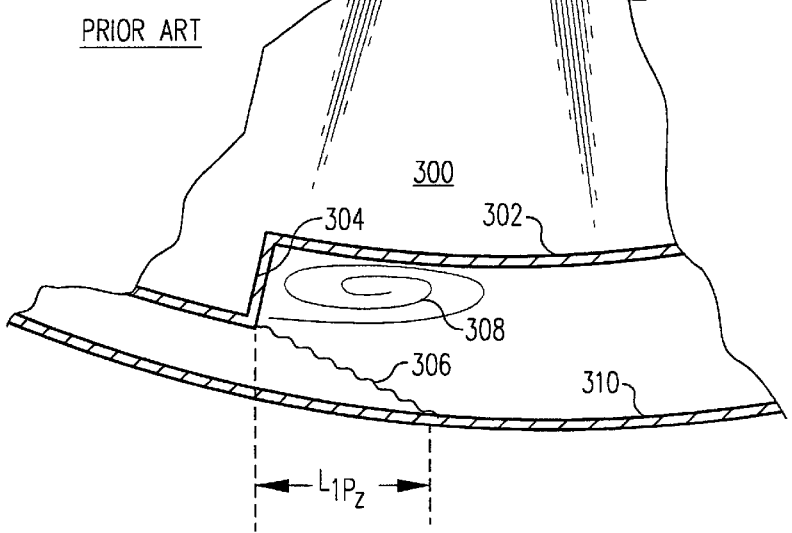
FIG. 13 is a cross-sectional view of a prior art ramjet burner design for a stationary, rotary ramjet engine, illustrating the use of a single, long flame front.
Figure 14:
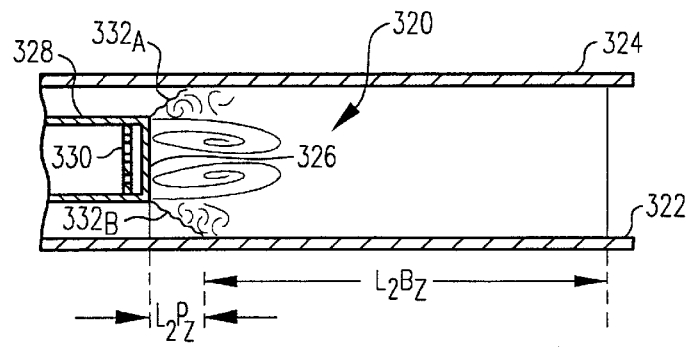
FIG. 14 is view taken along the circumference of a rotor, looking down on the novel combustor taught herein, showing the use of at least two short length flame fronts.

We have now determined that the length of a primary mixing zone "$L_2P_z$" in a ramjet combustor can be shortened considerably by adopting the configuration illustrated in FIG. 14. Then a burnout zone $L_2B_z$ can be provided as appropriate to achieve emissions objectives. This figure is a view taken looking radially inward along the circumference of a rotor, looking down on the exemplary combustor 320 taught herein. Combustor 320 is situated between an inlet strake 322 and an outlet strake 324, behind rear wall 326 of centerbody 328. In one embodiment, rear wall 326 of the centerbody 328 includes provision by way of a perforated wall 330 operably communicating with cooling gas source, for impingement cooling of rear wall 326 by the addition of perforations for coolant passageways 348 in wall 326. Alternately, or in addition, effusion cooling is provided for rear wall 326. As shown in FIG. 14, at least two short length flame fronts $332_A$ and $332_B$ are provided. This results in a primary mixing zone of length "$L_2P_z$" which is roughly half as long as when a single flame front is utilized as in the prior art design such as shown in FIG. 13. For a combustor of given length, the burnout zone, $L_2B_z$, is lengthened when such a combustor 320 arrangement is utilized.

Figure 15:
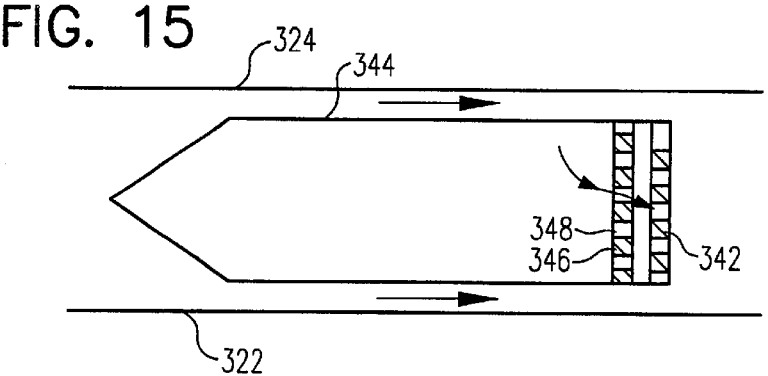
Figure 15A:
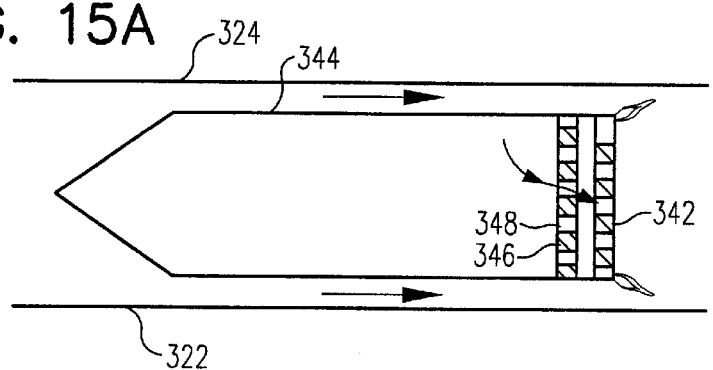

FIGS. 15, 15A, 16, 17, and 18 illustrate yet further enhanced embodiments of an exemplary combustor for a stationary rotary ramjet engine. In FIG. 15, the combustor design utilizes a simple bluff body 340, as earlier shown in FIG. 7. As further illustrated in FIG. 15A, this embodiment is now shown enhanced with the combination of impingement and effusion cooling on the rear wall/flameholder 342 of centerbody 344, utilizing an interior wall 346 with coolant passageways 348 therethrough, similar to the configuration just indicated in FIG. 14. Although this simple, robust bluff body combustor design allows easy sizing for the required inlet velocity, the combustion efficiency is less than optimum since the length of primary zone is not as compact as it could be, and perhaps would encounter unsteady vortex shedding, and thus combustion efficiency might be less than optimal. Therefore reduced combustion intensity would be expected, compared to even further improved combustors as explained below. Also, this design may be expected to be somewhat susceptible to vortex shedding, and thus, would not be an optimum design solution for many commercially important rotary ramjet combustor designs.

Figure 16:
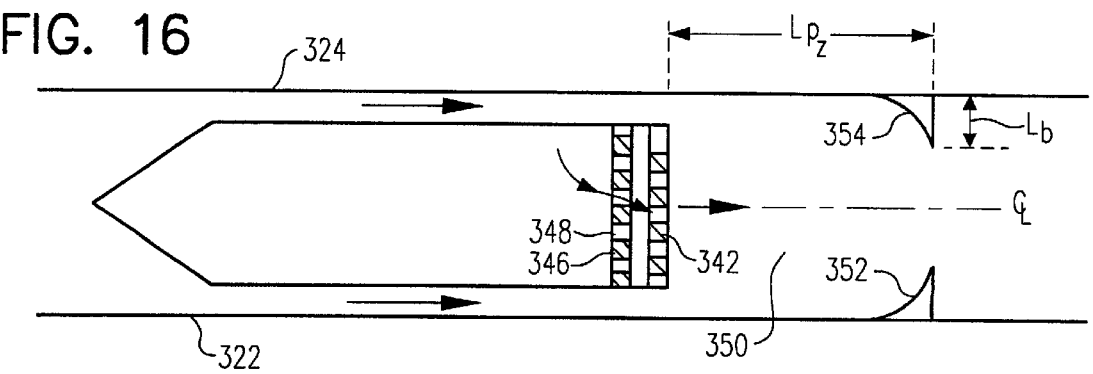
Figure 16A:
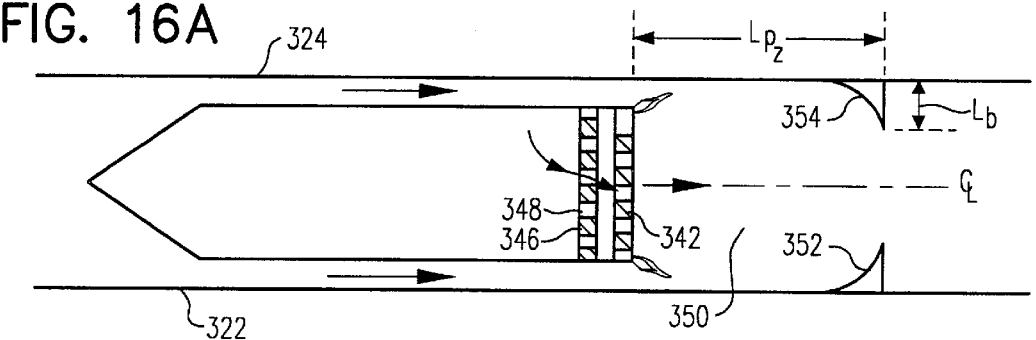
Figure 23:
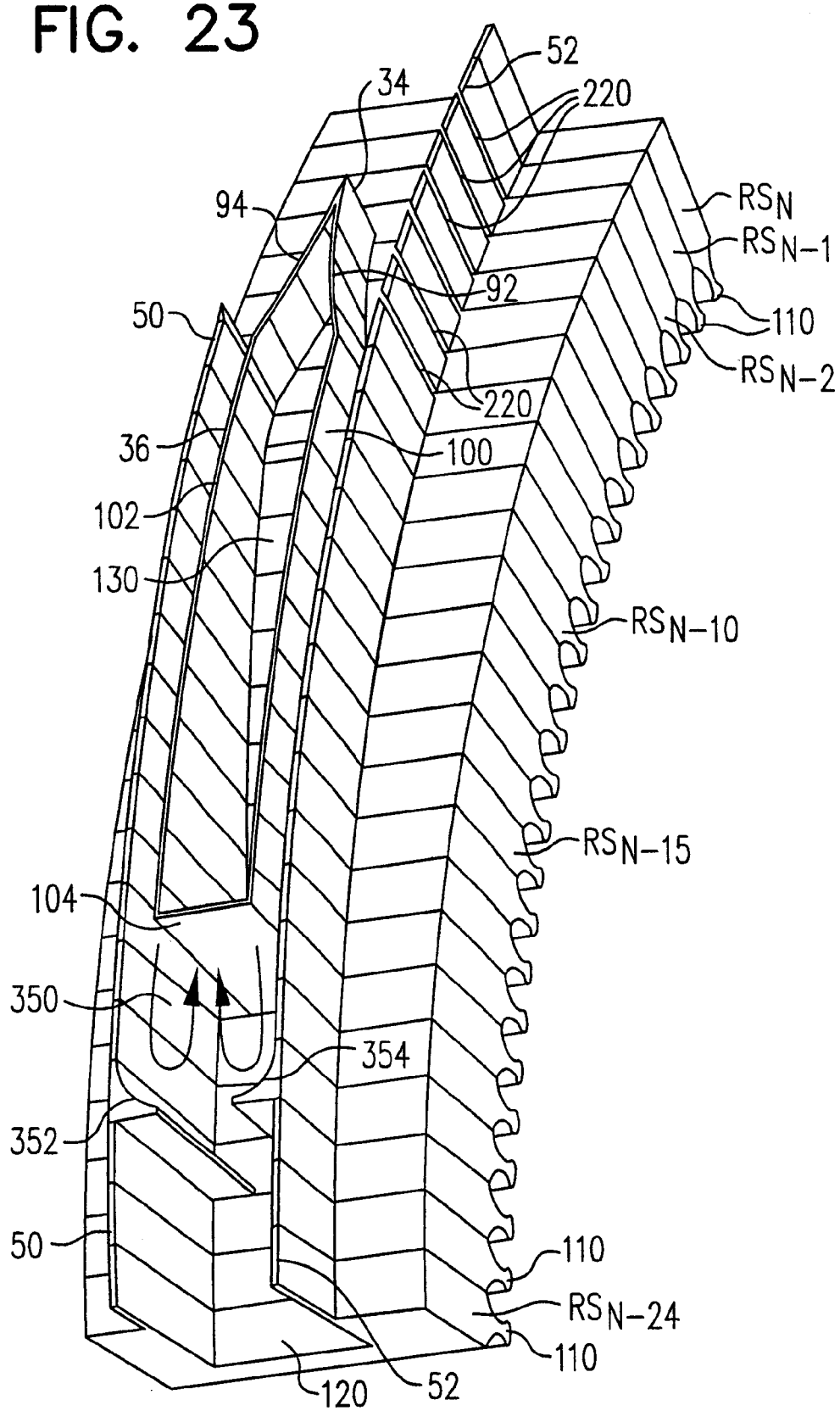
FIG. 23 further illustrates the design first set forth in FIG. 16A, and further illustrates the use of side ramps.

Turning now to FIG. 16, an exemplary combustor 350 has been developed that is further enhanced via use of side ramps 352 and 354 which convert some tangential fluid momentum to transverse fluid momentum. Side ramps 352 and 354 cooperate to deflect combustion gases away from the inlet strake 322 and outlet strake 324 and towards a centerline $C_L$ of the rear wall 342 of the inlet centerbody 344, by each extending transversely into the combustor 350 a distance $L_b$. Preferably, this length $L_b$ is the same for each vortex generator. This combustor 350 configuration increases the flame holding, because in this modified bluff body design, increased flame holding surface area is provided due to side ramps 352 and 354. This combustor 350 also affords a short length of primary combustion zone "$Lp_z$". However, for certain applications, this design may also have additional (potentially) undesirable pressure drop, flow-wise through the combustor 350, as compared to the configuration just illustrated in FIG. 15 above. A perspective view of this embodiment is provided in FIG. 23.

Figure 17:
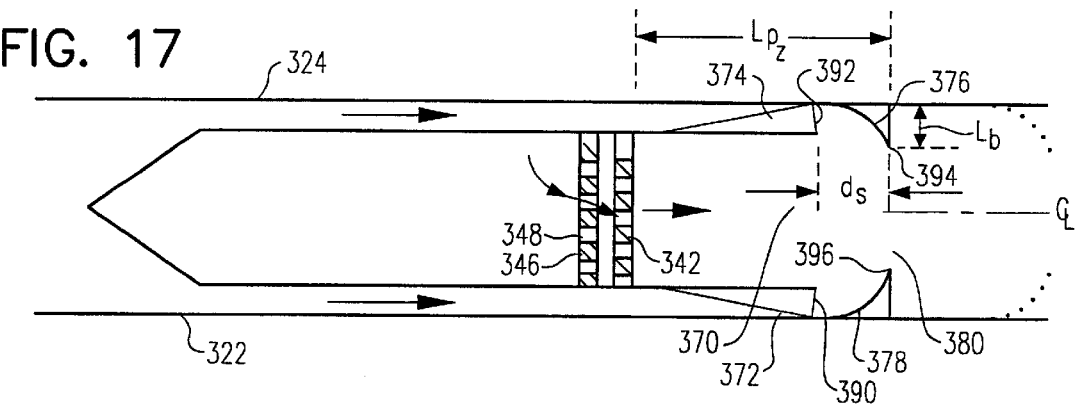
Figure 17A:
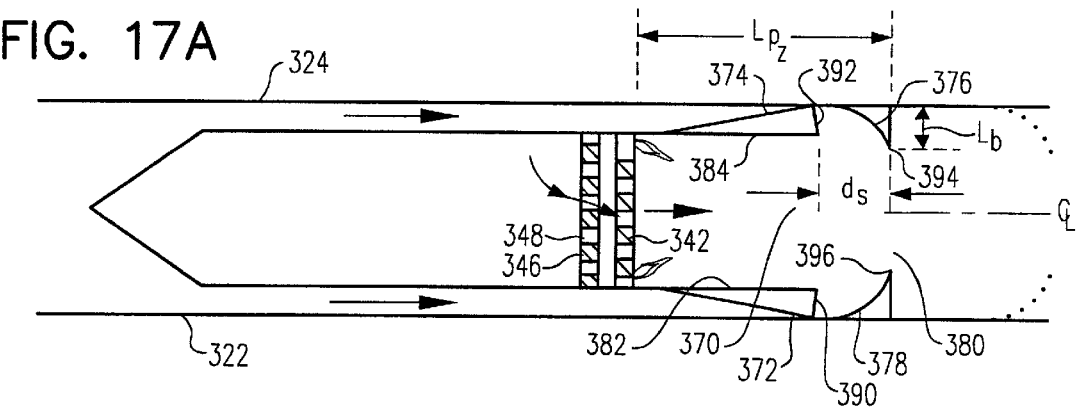
Figure 19:
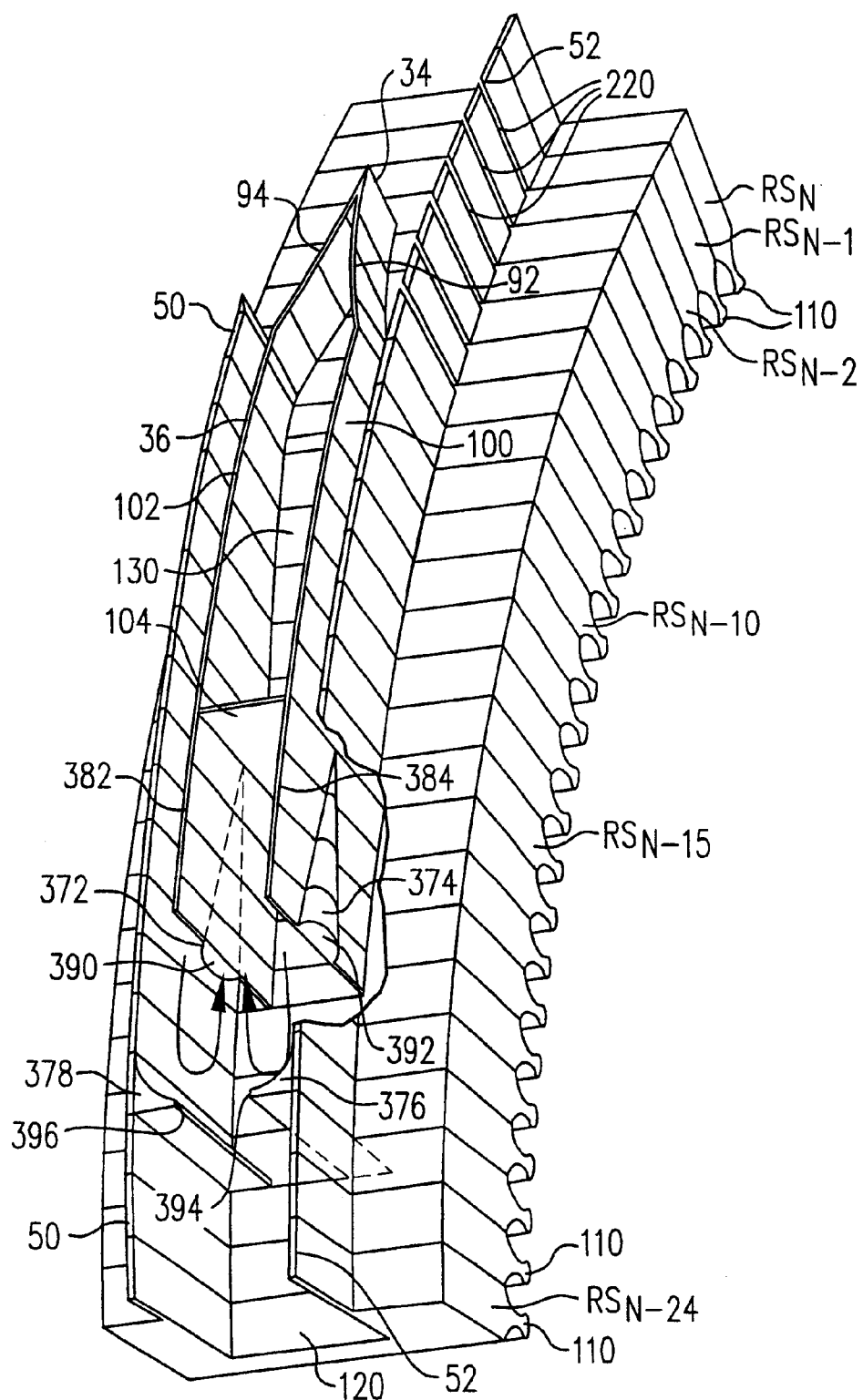
FIG. 19 provides a perspective of the design first set forth in FIG. 17A above, and further illustrates the use of both side skirts and side ramps to change direction of an inlet air stream to achieve thorough mixing in the combustion chamber.

In FIGS. 17 and 17A, another exemplary combustor 370 is further enhanced via use of flow splitting side skirts 372 and 374 to enhance mixing with multiple jets, i.e., the side skirts 372 and 374 moves entering fuel air mixtures in a radially inward or outward direction, and another set of side ramps 376 and 378 move the burning gases in transverse, axial and opposing direction. The combustor 370 configuration has a strong recirculation zone due to the jet impingement in the swirler space 380, defined by a distance $d_s$ between the tails 390 and 392 of the side skirts 372 and 374, and the trailing edges 394 and 396 of the side ramp vortex generators 376 and 378, respectively. The combustor 370 has a high efficiency, i.e., heat release per unit volume, due to the increased turbulence activity resulting from jet impingement. This design is better seen in FIG. 19, where a first side skirt 372 is provided on the inlet side of a first extended centerbody wall 382, and a second side skirt 374 is are provided on the inlet side of a second extended centerbody wall 384.

In yet a further enhancement, in FIG. 18, an exemplary combustor 400 is provided using an aft body 402 for provision of trapped vortices 404 and 406. This combustor 400 configuration has lower pressure drop through the combustor 400 relative to the simple bluff body configuration illustrated in FIG. 15. Additionally, flame stability is improved through the locking of downstream vortices between the fore body 342 and the aft body 402. And, by providing for sufficient space rearward (flow-wise) of the aft body 402, the large burnout zone $B_z$ is provided. Thus, a compact primary zone Pz having a relatively high combustor efficiency is provided. Note that this or the other just provided designs are shown utilizing the impingement and effusion cooling methods first discussed in connection with FIG. 15 above.

In FIGS. 17 and 18, the efficient combustion and high heat release per unit of combustor volume is made possible with a highly turbulent primary zone. Importantly, the jet impingement, and pumping action, as is further illustrated in FIG. 19, may increase combustor efficiency to at least 99% or more, and more preferably, to at least 99.5% or more.

FIG. 20 illustrates the use of multiple inlet centerbodies 500 and 502 on a rotor 504 for use in a rotary ramjet engine inlet, where two or more centerbodies are located between an inlet strake 506 and an outlet strake 508. As illustrated, aft bodies 510 and 512 are provided rearward of flameholding rear walls 514 and 516 of centerbodies 500 and 502, in order to provide for trapping of a vortex between the rear walls 514 or 516 and the aft bodies 510 or 512, respectively.

Figure 21:
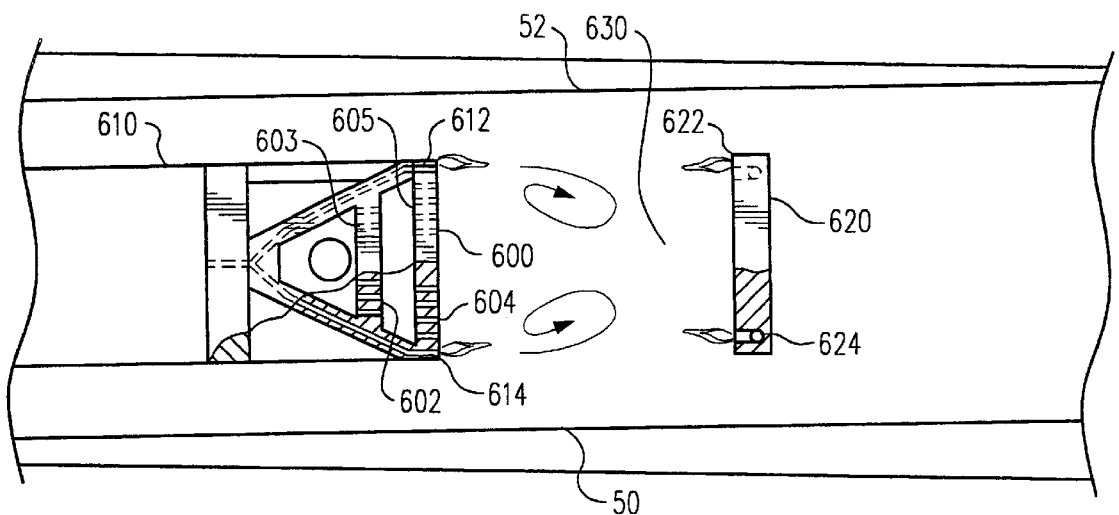
FIG. 21 illustrates a trapped vortex design that provides a forebody and an aft body to provide a combustor.

In FIG. 21, an exemplary enhanced double wall flameholding rear wall 600 with both impingement cooling passageways 602 in a first wall 603 and effusion cooling passageways 604 in a second wall 605 is provided for inlet centerbody 610. Also, pilot fuel ports 612 and 614 are provided. Additionally, an aft body 620 with pilot fuel ports 622 and 624 provide for trapped vortex operation of combustor 630.

Figure 22:
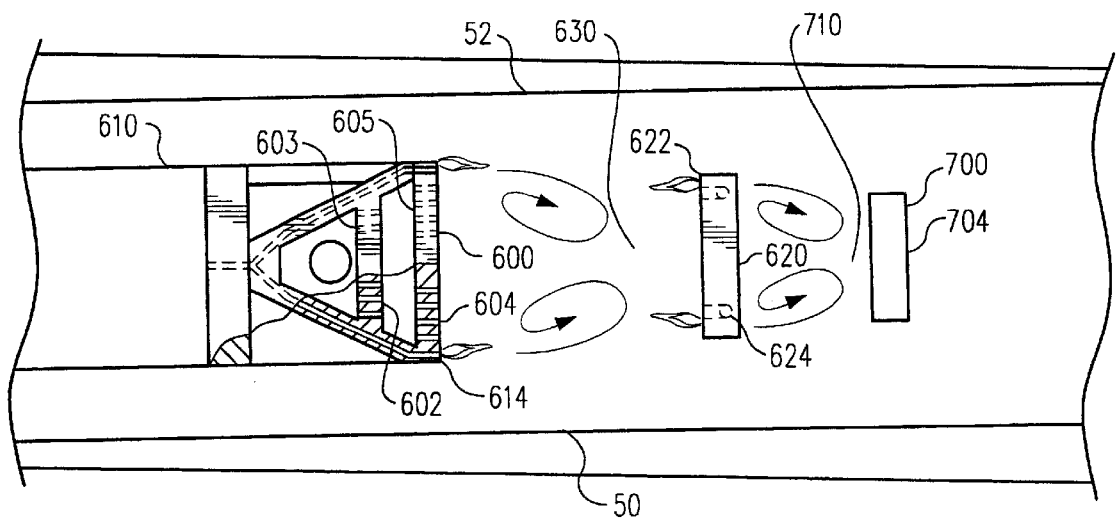
FIG. 22 illustrates a trapped vortex design that provides an enhanced trapped vortex embodiment, which may improve flame stability and increase combustor performance, by the addition of a forebody, a first aft body, and a second aft body.

In FIG. 22, an exemplary double bluff body configuration is shown. Here both a first aft bluff body 620 and a second aft bluff body 700 are illustrated. This exemplary embodiment may utilize the double wall flameholding rear wall 600 configuration as just illustrated in FIG. 21 above. However, a second bluff body 700 having a rear wall 704 is provided for creating both a second recirculation zone 730, in addition to the first recirculation zone 630 as illustrated in FIG. 21 above. This configuration allows further enhancement of combustion efficiency.

It is to be appreciated that the various aspects and embodiments of the inlet and combustion chamber designs described herein are an important improvement in the state of the art of rotary ramjet engines. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A rotary ramjet engine, said engine comprising:
   (a) an engine case comprising a substantially cylindrical tubular interior wall;
   (b) a rotor and shaft rotatably disposed with respect to said engine case,
      (i) said shaft oriented along a longitudinal axis,
      (ii) said rotor disposed for rotary motion in a plane perpendicular to said longitudinal axis, and
      (iii) said rotor having a rim surface portion;
   (c) at least one set of spaced apart strakes,
      (i) each of said at least one set of strakes disposed along a first helical axis with respect to said plane of rotary motion of said rotor,
      (ii) each of said at least one set of strakes extending outward from said rim surface portion of said rotor toward said interior wall of said engine case, less a running clearance therefrom;
   (d) at least one inlet centerbody for each set of strakes,
      (i) said at least one inlet centerbody disposed along a second helical axis,
      (ii) said at least one inlet centerbody comprising a leading edge structure, opposing sidewalls and a rear end wall;
   (e) wherein said strakes in each of said set strakes cooperate to define, rearward of said rear end wall of said at least one inlet centerbody, a combustor for trapping and mixing therewithin an inlet fluid and for providing a space therewithin for combustion of said inlet fluid to produce high energy products of combustion and to turn said rotor to produce power at said shaft.

2. The apparatus as set forth in claim 1, wherein said leading edge structure extends from said rim surface portion of said rotor toward said interior wall of said engine case, less a first running clearance therefrom, said first running clearance sufficiently small so as to avoid leakage of said products of combustion to an extent substantially deleterious to performance of said engine.

3. The apparatus as set forth in claim 1, wherein said opposing sidewalls of said inlet centerbody each extend from said rim surface portion of said rotor toward said interior wall, less a second running clearance therefrom, said second running clearance sufficiently small so as to avoid leakage of said products of combustion to an extent substantially deleterious to performance of said engine.

4. The apparatus as set forth in claim 3, wherein said second running clearance is approximately 0.025 inches or less.

5. The apparatus as set forth in claim 3, wherein said second running clearance is approximately 0.010 inches or less.

6. The apparatus as set forth in claim 3, wherein said second running clearance is approximately 0.005 inches or less.

7. The apparatus as set forth in claim 1, wherein said rear end wall extends from said rim surface portion of said rotor toward said interior wall of said engine casing, less a third running clearance therefrom which is sufficiently small so as to avoid leakage of said products of combustion from said combustor to an extent substantially deleterious to performance of said engine.

8. The apparatus as set forth in claim 7, wherein said third running clearance is approximately 0.025 inches or less.

9. The apparatus as set forth in claim 7, wherein said third running clearance is approximately 0.010 inches or less.

10. The apparatus as set forth in claim 7, wherein said third running clearance is approximately 0.005 inches or less.

11. The apparatus as set forth in claim 1, wherein said inlet centerbody comprises a constant area diffuser wall portion, wherein at least a portion of said sidewalls of said inlet body are disposed so as to maintain a substantially constant area supersonic diffuser between said set of strakes and said inlet centerbody.

12. The apparatus as set forth in claim 11, wherein exhaust gas exits said ramjet outlet nozzle at an exit angle with respect to said plane of rotation of said rotor.

13. The apparatus as set forth in claim 1, wherein said inlet centerbody comprises an increasing area subsonic diffuser section, wherein at least a portion of said opposing sidewalls of said inlet body are disposed so as to provide, flow-wise, an increasing effective diffuser cross-sectional area between said set of strakes and said inlet centerbody.

14. The apparatus as set forth in claim 1, wherein said inlet centerbody comprises a multi-surface structure, and wherein said opposing sidewalls comprise a set of compression ramps.

15. The apparatus as set forth in claim 14, wherein said set of compression ramps compress inlet air laterally outward against said inlet and said exhaust strakes.

16. The apparatus as set forth in claim 14, wherein said multi-surface structure is polygonal in shape.

17. The apparatus as set forth in claim 16, wherein said polygonal shaped structure is five sided.

18. The apparatus as set forth in claim 16, wherein said polygonal shaped structure is seven sided.

19. The apparatus as set forth in claim 1, further comprising, disposed rearward of and spaced apart from said rear end wall of said inlet centerbody, a ramjet outlet nozzle so as to define a combustor therebetween.

20. The apparatus as set forth in claim 19, wherein said combustor has a length sufficient to provide a residence time of gas in said combustor to reduce residual carbon monoxide in said products of combustion to a preselected concentration level.

21. The apparatus as set forth in claim 19, wherein said length provides a residence time of gas in said combustor from approximately 5 milliseconds to approximately 10 milliseconds.

22. The apparatus as set forth in claim 1, wherein said set of stakes comprises one inlet strake and one exhaust strake for each inlet centerbody.

23. The apparatus as set forth in claim 1, wherein two or more centerbodies are provided between an inlet strake and an outlet strake.

24. The apparatus as set forth in claim 1, wherein the ratio of the number of inlet strakes in said set of strakes to the number of inlet centerbodies is one.

25. The apparatus as set forth in claim 1, wherein in the region of the inlet, the ratio of the total number of inlet and exhaust strakes to the number of inlet centerbodies is two.

26. The apparatus as set forth in claim 1, wherein in the region of the inlet, the ratio of the total number of inlet strakes plus the number of exhaust strakes to the number of inlet centerbodies is one.

27. The apparatus as set forth in claim 1, wherein a plurality of aerodynamic ducts containing said inlet centerbodies are arranged spirally around the rim surface portion of said rotor.

28. The apparatus as set forth in claim 27, wherein said combustor is located in said aerodynamic duct, and wherein said combustor has at least one portion flow-wise having a uniform cross-sectional shape.

29. The apparatus as set forth in claim 28, wherein said combustor has a substantially rectangular cross section.

30. The apparatus as set forth in claim 1, wherein said helical axis of said set of strakes and said helical axis of said inlet centerbody are substantially parallel.

31. The apparatus as set forth in claim 1, wherein said helical axis of said set of strakes is offset from said plane of rotary motion of said rotor by a strake offset angle.

32. The apparatus as set forth in claim 31, wherein said offset angle is from more than zero to approximately 15 degrees.

33. The apparatus as set forth in claim 32, wherein said offset angle is from about zero to about 10 degrees.

34. The apparatus as set forth in claim 32, wherein said offset angle is less than about 5 degrees.

35. The apparatus as set forth in claim 32, wherein said offset angle is about 3 degrees or less.

36. The apparatus as set forth in claim 32, wherein said offset angle is about 1.55 degrees or less.

37. The apparatus as set forth in claim 32, wherein said inlet centerbody is offset from said plane of rotary motion of said rotor by a centerbody offset angle which is substantially equal to said strake offset angle.

38. The apparatus as set forth in claim 37, wherein said centerbody offset angle is less than approximately 15 degrees.

39. The apparatus as set forth in claim 1, wherein the ratio of the axial inlet velocity to the tangential inlet velocity is substantially equal to the ratio of the exhaust axial velocity to the exhaust tangential velocity.

40. The apparatus as set forth in claim 1, comprising a plurality of inlet centerbodies.

41. The apparatus as set forth in claim 1, wherein said rotor comprises a surface portion, said apparatus further comprising at least a partial rotor housing, said at least a partial rotor housing spaced apart from said surface portion of said rotor by a small gap G, wherein aerodynamic drag of said rotor surface is minimized.

42. The apparatus as set forth in claim 1, wherein one of said set of strakes is an outlet strake, and wherein said outlet strake, in the region of said leading edge of said centerbody, comprises a plurality of strake segments having radially extending slot gaps therebetween.

43. The apparatus as set forth in claim 42, wherein at least some of said strake segments further comprise leading edge knife portions, and wherein said leading edge knife portions are configured to provide said slot gaps rearward, flowwise, of said leading edge knife portion.

44. A rotary ramjet engine, said engine comprising:
(a) an engine case, said engine case comprising an interior wall;
(b) a rotor and shaft rotatably mounted with respect to said engine case,
  (i) said shaft oriented along a longitudinal axis,
  (ii) said rotor disposed for rotary motion in a plane perpendicular to said longitudinal axis, and
  (iii) said rotor having a rim surface portion;
(c) at least one set of spaced apart strakes,
  (i) each of said at least one set of strakes disposed along a helical axis with respect to said plane of rotary motion of said rotor,
  (ii) each of said set of strakes extending outward from said rim surface portion of said rotor to said interior wall of said engine case, less a running clearance therefrom;
(d) at least one inlet centerbody for each set of strakes,
  (i) said at least one inlet centerbody disposed along a helical axis,
  (ii) said at least one inlet centerbody comprising a leading edge structure, opposing sidewalls, and a rear end wall;
(e) wherein each of said set of strakes cooperate to define, rearward of said rear end wall of said at least one inlet centerbody, a combustor for mixing therewithin said inlet fluid and burning fuel therein to form hot combustion exhaust gases therefrom;
(f) a ramjet outlet nozzle structure,
  (i) said structure comprising a converging ramjet nozzle, nozzle throat, and diverging ramjet nozzle,
  (ii) said outlet nozzle structure for receiving said hot combustion exhaust gases and discharging, at a preselected helical angle to said plane of rotation, a jet of combustion exhaust gases.

45. The apparatus as set forth in claim 1 or 44, wherein each of said at set of strakes comprises (a) an inlet strake, and (b) an outlet strake.

46. The apparatus as set forth in claim 1 or claim 44, wherein said inlet centerbody further comprises at least one side skirt, said side skirt angularly exposed to said inlet fluid stream so as to impart at least some flow thereof in a radial direction.

47. The apparatus as set forth in claim 46, wherein said set of strakes further comprises a set of side ramps, said set of side ramps angularly exposed to said inlet fluid stream so as to impart at least some flow thereof in an axial direction.

48. The apparatus as set forth in claim 1, or claim 44, wherein said set of strakes further comprises a set of side ramps, said set of side ramps angularly exposed to said inlet fluid stream so as to impart at least some flow thereof in an axial direction.

49. The apparatus as set forth in claim 48, wherein said inlet centerbody further comprises, at the rear wall thereof, at least one fuel port, said fuel port adapted to supply fuel for a pilot flame in said combustor.

50. The apparatus as set forth in claim 1, or in claim 44, further comprising an aft body, said aft body and said rear wall of said inlet centerbody cooperating to define therebetween a combustor of sized and shaped to trap therebetween a fluid vortex.

51. A rotary ramjet engine, said engine comprising:
(a) an engine case means for housing a rotor, said engine case means comprising an interior wall means;
(b) a rotor and shaft rotatably mounted with respect to said engine case means,
  (i) said shaft oriented along a longitudinal axis, and
  (ii) said rotor disposed for rotary motion in a plane perpendicular to said longitudinal axis, and
  (iii) said rotor having a rim surface;
(c) at least one set of spaced apart strakes,
  (i) each of said at least one set of strakes disposed along a helical axis with respect to said plane of rotary motion of said rotor,
  (ii) each of said set of strakes extending outward from said rim surface of said rotor to said interior wall of said engine case means, less a running clearance from said interior wall;
(d) at least one inlet centerbody located between each set of strake means,
  (i) said at least one inlet centerbody disposed along a helical axis,
  (ii) said at least one inlet centerbody comprising a leading edge, a sidewall, and a rear end wall;
(e) said set of strakes cooperating to define, rearward of said rear end wall, a combustion chamber for mixing therewithin an inlet fluid and burning fuel therein to form hot combustion gases therefrom;
(f) a ramjet outlet nozzle, said nozzle defining an outlet for a jet of hot exhaust gases from said combustion chamber at a preselected helical angle to said plane of rotation of said rotor.

52. A method of operating a rotary ramjet engine, said rotary ramjet engine comprising
(a) an engine case, said engine case comprising an interior wall;
(b) a rotor and shaft rotatably mounted with respect to said engine case,
  (i) said shaft oriented along a longitudinal axis,
  (ii) said rotor disposed for rotary motion in a plane perpendicular to said longitudinal axis, and
  (iii) said rotor having a rim surface portion;
(c) at least one set of spaced apart strakes,
  (i) each of said at least one set of strakes disposed along a helical axis with respect to said plane of rotary motion of said rotor,
  (ii) each of said set of strakes extending outward from said rim surface portion of said rotor to said interior wall of said engine case, less a running clearance therefrom;
(d) at least one inlet centerbody for each set of strakes,
  (i) said at least one inlet centerbody disposed along a helical axis,
  (ii) said at least one inlet centerbody comprising a leading edge structure, a set of sidewalls defining therebetween a shaped cavity, and a rear end wall;
(e) wherein each of said set of strakes cooperate to define, rearward of said rear end wall of said at least one inlet centerbody, a combustion chamber for mixing therewithin said inlet fluid and burning fuel therein to form hot combustion exhaust gases therefrom;
(f) a ramjet outlet nozzle structure,
  (i) said structure comprising a converging ramjet nozzle, nozzle throat, and diverging ramjet nozzle,
  (ii) said outlet nozzle structure for receiving said hot combustion exhaust gases and discharging, at a preselected helical angle to said plane of rotation, a jet of hot combustion exhaust gases;
(g) said method comprising matching the ratio of the axial velocity of the inlet fluid to the tangential velocity of the inlet fluid with the helical angle of said inlet centerbody, so that the angle of attack of said leading edge of said inlet centerbody is negligible.

53. The method as set forth in claim 52, wherein said inlet fluid is compressed laterally between said inlet centerbody and said strakes.

54. The method as set forth in claim 53, wherein said inlet fluid is compressed against said interior wall of said engine casing.

55. The method as set forth in claim 54, wherein said inlet fluid, after compression, is not a detonable fuel/air mixture, based on the composition, temperature, and pressure of said fuel/air mixture.

56. The method as set forth in claim 52, wherein said inlet fluid comprises gaseous fuel from a source selected from the group comprising (a) coal bed methane, (b) coal mine purge gas, (c) landfill gas, (d) biogas.

57. The method as set forth in claim 52, wherein said inlet fluid comprises a gaseous hydrocarbon fuel selected from the group comprising (a) natural gas, (b) propane, (c) utility quality pipeline gas, (d) sewer gas, (e) flare gas from petroleum refining operations.

58. The method as set forth in claim 52, wherein said hot combustion exhaust gases comprise a preselected concentration level of NOx.

59. The method as set forth in claim 52, wherein said hot combustion exhaust gases comprise 5 ppm or less of NOx.

60. The method as set forth in claim 52, wherein said hot combustion exhaust gases comprise 4 ppm or less of NOx.

61. The method as set forth in claim 52, wherein one of said set of strakes is an outlet strake, and wherein said outlet strake, in the region of said leading edge of said centerbody, comprises a plurality of strake segments having radially extending gaps therebetween, said gaps configured to allow escape of at least a portion of said inlet air therethrough.

* * * * *

UNITED STATES PATENT AND TRADEMARK OFFICE
CERTIFICATE OF CORRECTION

PATENT NO. : 6,694,743 B2
DATED : February 24, 2004
INVENTOR(S) : Shawn P. Lawlor, Robert C. Steele and Donald Kendrick It is certified that error appears in the above-identified patent and that said Letters Patent is hereby corrected as shown below:

Drawings,
Remove FIG. 22 and replace with FIG. 22 as set forth below.

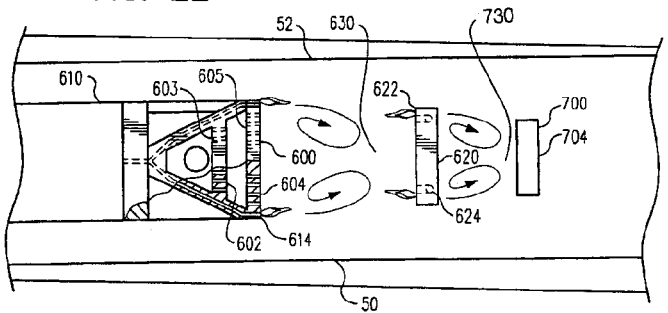

Column 3,
Line 14, after the words "Such a", delete "the".

Column 4,
Line 60, after the words "chamber", delete "," and substitute therefore -- . --.

Column 7,
Line 50, after the words "casing 62", delete ".".
Line 52, after the word "height", delete "$H_{10o}$ and $_{H102}$," and substitute therefor -- $H_{100}$ and $H_{102}$, --.

Column 8,
Line 32, after the words "which may", delete "be".

Column 13,
Line 49, after the words "end wall" delete ";" and insert -- , said at least one inlet centerbody comprising planar walls projecting substantially radially outward from said rim surface portion; --

Column 16,
Line 29, after the words "end wall" delete ";" and insert -- , said at least one inlet centerbody comprising planar walls projecting substantially radially outward from said rim surface portion; --
Line 43, after the words "each of said", delete "at".

UNITED STATES PATENT AND TRADEMARK OFFICE
CERTIFICATE OF CORRECTION

PATENT NO. : 6,694,743 B2
DATED : February 24, 2004
INVENTOR(S) : Shawn P. Lawlor, Robert C. Steele and Donald Kendrick It is certified that error appears in the above-identified patent and that said Letters Patent is hereby corrected as shown below:

Column 17,
Line 24, after the words "end wall" delete ";" and insert -- , said at least one inlet centerbody comprising planar walls projecting substantially radially outward from said rim surface portion; --

Column 18,
Line 3, after the words "end wall" delete ";" and insert -- , said at least one inlet centerbody comprising planar walls projecting substantially radially outward from said rim surface portion; --
Line 34, after the words "landfill gas," insert -- and --.
Line 38, after the words "sewer gas," insert -- and --.

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,694,743 B2
APPLICATION NO. : 10/200780
DATED : February 24, 2004
INVENTOR(S) : Shawn P. Lawlor, Robert C. Steele and Donald Kendrick It is certified that error appears in the above-identified patent and that said Letters Patent is hereby corrected as shown below:

IN THE SPECIFICATION:

Column 1, line 24, after the words "disclosure of which is incorporated herein in its entirety by this reference.", insert the following paragraph:

--STATEMENT OF GOVERNMENT INTEREST

This invention was made with Government support under Contract No. DE-FC26-00NT40915 awarded by the United States Department of Energy. The U.S. Government has certain rights in the invention .--

Signed and Sealed this

Nineteenth Day of February, 2008

JON W. DUDAS
*Director of the United States Patent and Trademark Office*